United States Patent
Richard Muir et al.

(10) Patent No.: US 12,547,717 B2
(45) Date of Patent: Feb. 10, 2026

(54) NEURAL NETWORK CONFIGURATION PARAMETER TRAINING AND DEPLOYMENT METHOD AND APPARATUS FOR COPING WITH DEVICE MISMATCH

(71) Applicant: CHENGDU SYNSENSE TECHNOLOGY CO., LTD., Sichuan (CN)

(72) Inventors: Dylan Richard Muir, Zurich (CH); Julian Buchel, Zurich (CH); Fynn Faber, Zurich (CH)

(*) Notice: Subject to any disclaimer, the term of this patent is extended or adjusted under 35 U.S.C. 154(b) by 209 days.

(21) Appl. No.: 18/259,989

(22) PCT Filed: May 7, 2022

(86) PCT No.: PCT/CN2022/091399
§ 371 (c)(1),
(2) Date: Jun. 29, 2023

(87) PCT Pub. No.: WO2022/242471
PCT Pub. Date: Nov. 24, 2022

(65) Prior Publication Data
US 2024/0320337 A1  Sep. 26, 2024

(30) Foreign Application Priority Data
May 17, 2021 (CN) .......... 202110550756.3

(51) Int. Cl.
*G06F 21/56* (2013.01)
*G06N 3/065* (2023.01)
*G06N 3/08* (2023.01)

(52) U.S. Cl.
CPC .......... *G06F 21/566* (2013.01); *G06N 3/065* (2023.01); *G06N 3/08* (2013.01); *G06F 2221/034* (2013.01)

(58) Field of Classification Search
CPC . G06F 21/566; G06F 2221/034; G06N 3/065; G06N 3/08
(Continued)

(56) References Cited

U.S. PATENT DOCUMENTS 10,963,692 B1 * 3/2021 Corcoran ............. G06V 30/414
12,254,678 B2 * 3/2025 Calian ................ G06V 10/7747
(Continued)

FOREIGN PATENT DOCUMENTS

CN  111898635 A  11/2020
CN  111950693 A * 11/2020 ........... G05D 1/0221
(Continued)

OTHER PUBLICATIONS

Büchel et al., Network Insensitivity to Parameter Noise via Adversarial Regularization, arXiv preprint arXiv:2106.05009, pp. 1-29 (2021) (Year: 2021).*
(Continued)

*Primary Examiner* — David P Zarka
(74) *Attorney, Agent, or Firm* — Michael D. Eisenberg; MDE Patents

(57) ABSTRACT

A neural network (NN) configuration parameter training and deployment method and apparatus are disclosed. The method and the apparatus include searching for simulated attacked NN configuration parameters on a basis of NN configuration parameters, so that the attacked NN configuration parameters move in a direction of maximal divergence from an NN output result corresponding to the NN configuration parameters; taking a difference in an NN output result between the current NN configuration parameters and the attacked NN configuration parameters as a robustness loss function which serves as a part of a total loss function; and finally, optimizing the NN configuration parameters on a basis of the total loss function. Especially
(Continued)

for sub-threshold and mixed-signal circuits with ultra-low power consumption, the solution can solve a problem of perturbations of configuration parameters caused by device mismatch, and achieve the technical effect of low-cost and high-efficiency deployment of parameters of NN accelerators.

20 Claims, 10 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2017/0316281 A1* | 11/2017 | Criminisi | G06F 18/2148 |
| 2018/0240010 A1* | 8/2018 | Faivishevsky | G06N 3/08 |
| 2020/0234110 A1 | 7/2020 | Singh et al. | |
| 2022/0058466 A1* | 2/2022 | Yang | G06N 3/08 |
| 2022/0086057 A1* | 3/2022 | Pezeshki | H04W 64/003 |
| 2022/0374702 A1* | 11/2022 | Kushmerick | G06N 3/0464 |
| 2024/0152822 A1* | 5/2024 | Yamada | G06N 20/00 |

FOREIGN PATENT DOCUMENTS

| | | | | |
|---|---|---|---|---|
| CN | 112035834 A | | 12/2020 | |
| CN | 113313233 A | | 8/2021 | |
| CN | 114337911 A | * | 4/2022 | ............... G06N 3/02 |
| CN | 116569211 A | * | 8/2023 | ......... G06K 9/00979 |
| EP | 3754557 A1 | | 12/2020 | |

OTHER PUBLICATIONS

Wu et al., Adversarial Weight Perturbation Helps Robust Generalization, 34th Conference on Neural Information Processing Systems, pp. 1-20 (2020) (Year: 2020).*
International Search Report (with English translation) and Written Opinion issued in PCT/CN2022/091399, mailed on Aug. 3, 2022.
Chinese Office Action issued in corresponding Chinese Patent Application No. 202110550756.3 dated Jul. 4, 2022, with English translation.

* cited by examiner

300 

302

Simulating an attack on the configuration parameters of an NN, wherein the simulated attack starts from the configuration parameters which are not attacked, and is reflected in a plurality of attacked configuration parameters which are virtual

304

Updating the configuration parameters, wherein a direction in which the configuration parameters that the simulated attack starts from are moved is determined by maximally decreasing, with respect to the configuration parameters, a first performance loss value of the NN while maximally decreasing, with respect to the configuration parameters, a robustness loss value of the NN, wherein the first performance loss value is located at the configuration parameters that the simulated attack starts from; wherein the robustness loss value reflects a second performance loss value of the NN located at the attacked configuration parameters that reflect the simulated attack; and wherein maximally decreasing the robustness loss value includes considering a causal relationship between a move of the configuration parameters that the simulated attack starts from and a resulting move of the attacked configuration parameters that reflect the simulated attack.

Simulating an attack on the configuration parameters of an NN, wherein the simulated attack starts from the configuration parameters which are not attacked, and is reflected in a plurality of attacked configuration parameters which are virtual; and wherein the simulated attack is bounded by a bounding box, wherein each of a plurality of dimensions of the bounding box has an increasing relationship with a magnitude of a corresponding configuration parameter of the configuration parameters that the simulated attack starts from.

NEURAL NETWORK CONFIGURATION PARAMETER TRAINING AND DEPLOYMENT METHOD AND APPARATUS FOR COPING WITH DEVICE MISMATCH

RELATED APPLICATIONS

This application is a US national phase application based upon an International Application No. PCT/CN2022/091399, filed on May 7, 2022, which claims priority to Chinese Patent Application No. 202110550756.3, filed with the Chinese Patent Office on May 17, 2021, and entitled "NEURAL NETWORK CONFIGURATION PARAMETER TRAINING AND DEPLOYMENT METHOD AND APPARATUS FOR COPING WITH DEVICE MISMATCH". The entire disclosures of the above application are incorporated herein by reference.

BACKGROUND OF DISCLOSURE

1. Field of Disclosure

The present invention relates to the field of training of neural network (NN) configuration parameters, and more particularly, to the field of NN training, wherein the NN training is based on an adversarial attack on the configuration parameters and can handle device mismatching problems.

2. Description of Related Art

Compared with digital circuits, mixed-signal circuits have significantly lower power consumption advantages. Neural network (NN) accelerators can be implemented by mixed-signal circuits that are fabricated by silicon chip fabrication methods. These methods induce variability in thicknesses and properties of the layers of materials that make up a fabricated chip. This variability causes the electrical behavior of the fabricated transistors and other devices to vary across a surface of a chip, and to differ from chip to chip—this is known as "device mismatch". Neuromorphic NN accelerators are, for example, one type of NN accelerators that is prone to device mismatch. A trained NN configuration parameters deployed on a plurality of mixed-signal NN chips can be attacked randomly by device-mismatch, wherein the attack causes random perturbations of the NN configuration parameters (hereinafter, referred to as network configuration parameters, configuration parameters, network parameters, network configuration, neural network parameters for short). The random perturbations of the NN configuration parameters can cause random reduction in task performance.

In order to solve a problem of mismatch-induced task performance reduction, one current method trains an NN separately for each mixed-signal NN chip, using the chip itself as part of the training algorithm. However, this training is time- and energy-consuming and raises costs for deployment processes significantly.

A training method called "dropout" is used to reduce sensitivity of individual configuration parameters. That is, for changes in the individual configuration parameters between chips on which the individual configuration parameters are deployed, the network reduces dependence on the individual configuration parameters and thus, performance degradation is no longer obvious. But this is not possible for a situation where mismatch may occur for all configuration parameters.

One method adds calibration circuitry to ensure that behavior of every neuron and synapse (even parameter tuning) adheres to standard behavior, but the introduction of the calibration circuitry increases power consumption, chip area, and cost, and reduces yield, etc.

Another current method optimizes, during training an NN, a plurality of network configuration parameters of the NN to combat the problem of mismatch-induced task performance reduction. The method mainly includes following steps:

Given the NN configuration parameters obtained from a previous iteration of optimizing the NN for performance, for a current iteration of optimizing the NN for performance, an attack on the NN configuration parameters is simulated by randomly selecting a subset of the NN configuration parameters and attacking the subset of the network configuration parameters to cause worst-case performance decrease of the NN. Then, the NN is optimized with respect to the attack on the network configuration parameters reflected in the subset of the network configuration parameters by updating a remaining set of the network configuration parameters to cause best-case performance of the NN to increase. Because the current method performs a simulation of the attack on the network configuration parameters using the network configuration parameters, if all the network configuration parameters were allowed to be attacked and then optimized, an update on the network configuration parameters caused by the attack on the network configuration parameters would be reverted by a subsequent update on the network configuration parameters, wherein the subsequent update is caused by the optimization of the NN with respect to the attack on the network configuration parameters. Thus, the current method performs the simulation of the attack on the network configuration parameters using the subset of the network configuration parameters and then performs the optimization of the NN with respect to the attack on the network configuration parameters using the remaining set of the network configuration parameters. Because in each iteration, only the subset of the network configuration parameters (which is a part) is considered and further, the subset of the network configuration parameters is randomly selected, it is difficult to simulate a systematic (e.g., worst-case) attack on the network configuration parameters of the NN. Further, because in each iteration, the attack on the network configuration parameters is combatted using a remaining set that is of the network configuration parameters (and is randomly selected in fact), it is difficult for the method to achieve systematic (e.g., best-case) combat of random attacks by device-mismatch.

Related prior art 1 ("Adversarial Weight Perturbation Helps Robust Generalization", Dongxian Wu, Shu-tao Xia, Yisen Wang, Tsinghua University, Peking University, Peng Cheng Laboratory, 34th Conference on Neural Information Processing Systems (NeurIPS 2020), Vancouver, Canada) simulates an attack on a plurality of network configuration parameters of an NN. The simulation is performed on a series of attacked network configuration parameters which are virtual. Related art 1 updates the network configuration parameters, wherein a direction in which the network configuration parameters from a previous iteration of optimizing the NN are moved is determined by maximally decreasing, with respect to the attacked parameters, a performance loss value of the NN located at the configuration parameters that reflect the simulated attack. Advantageously, because the attacked network configuration parameters are virtual, the simulated attack and combat of the simulated attack can be systematic.

Generally, related prior art 1 finds an adversarial attack on network configuration parameters/weights through adversarial inputs. That is:
1. finding an input perturbation which will cause the network performance to degrade;
2. given this new input, finding an attack on the parameters, wherein the attack maximally decreases performance;
3. repeating steps 1-2 several times;
4. for the given adversarial input and weights, using a gradient with respect to the adversarial weights to compute an update to the weights;
5. using the gradient with respect to the adversarial weights to update the original weights.

In view of the aforementioned deficiencies of the related prior art, technical problems to be solved by the present invention are as follows: How do we handle a problem that NN task processing performance is weakened because of generalized random perturbations of configuration parameters of an NN accelerator, which further causes a problem that configuration parameters of a chip cannot be deployed on a large scale? And how do we solve the problem including sub-optimality of the related art and improve anti-mismatch performance?

SUMMARY

To solve or partially alleviate the above problems, the present invention proposes a technical approach such as adding a robustness loss function to a training method to achieve a technical effect of deploying configuration parameters in circuits with generalized device mismatch. The specific solutions are as follows:

A neural network (NN) configuration parameter training method, wherein the training method is configured in a training apparatus, and the training apparatus performs the training method to obtain network configuration parameters that can be deployed on an NN accelerator, characterized in that the training method includes following steps:

step 100: initializing the NN configuration parameters $\Theta$;
step 110: initializing attacked NN configuration parameters $\Theta^*$;
step 120: calculating a step size $\alpha$ for each parameter in the configuration parameters $\Theta^*$;
step 130:
(a) calculating a gradient $g \rightarrow \nabla_{\Theta^*} \mathcal{L}_{robust}(f(\Theta,X), f(\Theta^*, X))$ of a robustness loss function with respect to the attacked configuration parameters $\Theta^*$, wherein $\nabla$ is a gradient operator, $\mathcal{L}_{robust}(f(\Theta,X), f(\Theta^*, X))$ is the robustness loss function that represents an NN output change, $f$ is an NN, and X is an input in a dataset;
(b) calculating an update vector v: within unit norm in $l^p$ space, calculating and obtaining a vector v that maximizes $v^T g$ as the update vector:

$$v \leftarrow \arg\max_{v: \|v\|_p \leq 1} v^T g,$$

where T is transpose, and there is a dot product operation between $v^T$ and g;
step 140: after multiplying the update vector v by the step size $\alpha$, adding $\alpha \cdot v$ to the current attacked configuration parameters $\Theta^*$; and in $l^p$ space, projecting a result of the addition onto an ellipsoid centered at $\Theta$ and having a quantization matrix $W=(\text{diag}(|\Theta|)\cdot \zeta_{relative}+I\cdot \zeta_{const})$, and using a result of the projection to update the configuration parameters $\Theta^*$: $\Theta^* \leftarrow \Pi_{Ellipsoid(\Theta, W, p)}(\Theta^* + \alpha \cdot v)$, where $\zeta_{relative}$ and $\zeta_{const}$ represent two constants, I is an identity matrix, diag(•) is a diagonal matrix, and |•| represents an element-wise absolute value;
step 150: looping through step 130 and step 140 sequentially $N_{steps}$ times;
step 160: calculating a robustness loss function $\mathcal{L}_{robust}(\Theta, \Theta^*, X, y)$, where y is a target output in a dataset;
step 170: calculating a target loss function $\mathcal{L}_{normal}(\Theta, X, y)$, where y is the target output in the dataset;
step 180: combining the target loss function $\mathcal{L}_{normal}(\Theta, X, y)$ and the robustness loss function $\mathcal{L}_{robust}(\Theta, \Theta^*, X, y)$ into a total loss function $\mathcal{L}_{total}(\Theta, X, y)$;
step 190: calculating a gradient $\nabla_\Theta \mathcal{L}_{total}$ of the total loss function with respect to the NN configuration parameters $\Theta$;
step 200: using an optimization method to modify the NN configuration parameters $\Theta$ on a basis of $\nabla_\Theta \mathcal{L}_{total}$;
step 210: looping through step 110 to step 200 $N_{opt}$ times;
step 220: returning the NN configuration parameters $\Theta$ which are final.

In some embodiments, the NN configuration parameters include one or more of the following: a weight, a time constant, or a threshold.

In some embodiments, in step 100, a plurality of the weights are configured according to a random normal distribution or all of the weights are configured to be zero; and/or the time constant is initialized to a reasonable default value or a random value within a reasonable range; and/or the threshold is initialized to a reasonable default value or a random value within a reasonable range.

In some embodiments, in step 110, the attacked configuration parameters $\Theta^*$ are initialized by adding noise to the configuration parameters $\Theta$:
$\Theta^* \leftarrow \Theta + |\Theta| \cdot \epsilon_{relative} \cdot R_1 + \epsilon_{const} \cdot R_2$; $R_1, R_2 \sim N(0,1)$, where |•| represents an element-wise absolute value, $\epsilon_{relative}$ and $\epsilon_{const}$ are two constants, and $R_1$ and $R_2$ are normally distributed random variables following $N(0,1)$.

In some embodiments, in step 120, in $l^\infty$ space where $p=\infty$, the step size $$\alpha = \frac{1}{N_{steps}} \cdot (|\Theta| \cdot \zeta_{relative} + \zeta_{const}).$$

In some embodiments, step (b) in step 130 is omitted, and in step 140, g is directly multiplied by the step size $\alpha$.

In some embodiments, in step 130 and step 140, $p=2$ or $\infty$.

In some embodiments, in step 150, a replacing loop termination condition is that a predetermined condition is met on a basis of measured adversarial performance.

In some embodiments, the condition that the predetermined condition is met on the basis of the measured adversarial performance specifically is that a value of the robustness loss function reaches a predetermined value.

In some embodiments, in step 160, $$\mathcal{L}_{robust}(\Theta, \Theta^*, X, y) = \frac{1}{B}\sum_{i=1}^{B} l_{rob}(f(\Theta, X_i), f(\Theta^*, X_i)),$$

where B represents batch size, i is a count, $l_{rob}$ represents distance between outputs $f(\Theta, X_i)$ and $f(\Theta^*, X_i)$.

In some embodiments, $l_{rob}(\cdot)$ is configured to be one of mean square error, forward Kullback-Leibler divergence, or reverse Kullback-Leibler divergence, or is defined on a basis of an attack on the network configuration parameters to be a metric of NN performance based on a task.

In some embodiments, in step 170, the target loss function $$\mathcal{L}_{normal}(\Theta, X, y) = \frac{1}{B}\sum_{i=1}^{B} l(f(\Theta, X_i), y_i),$$

where B is batch size, i is a count, and l(•) is a standard loss function.

In some embodiments, l(•) is a mean square error function or a categorical cross entropy function.

In some embodiments, in step 180, $\mathcal{L}_{total}(\Theta, X, y) = \mathcal{L}_{normal}(\Theta, X, y) + \beta_{rob} \cdot \mathcal{L}_{robust}(\Theta, \Theta^*, X, y)$, where $\beta_{rob}$ is a weighting factor controlling influence of the robustness loss on an optimization process.

In some embodiments, in step 200, the optimization method is stochastic gradient descent or gradient descent with momentum.

In some embodiments, in step 210, a replacing loop termination condition is that NN performance reaches a predetermined target.

In some embodiments, in step 130 and step 140, p=2 or ∞; in step 180, $\mathcal{L}_{total}(\Theta, X, y) = \mathcal{L}_{normal}(\Theta, X, y) + \beta_{rob} \cdot \mathcal{L}_{robust}(\Theta, \Theta+, X, y)$, where $\beta_{rob}$ is a weighting factor controlling influence of the robustness loss on an optimization process.

In some embodiments, in step 110, the attacked configuration parameters $\Theta^*$ are initialized by adding noise to the configuration parameters $\Theta$:
$\Theta^* \leftarrow \Theta + |\Theta| \cdot \epsilon_{relative} \cdot R_1 + \epsilon_{const} \cdot R_2$; $R_1, R_2 \sim N(0,1)$, where |•| represents an element-wise absolute value, $\epsilon_{relative}$ and $\epsilon_{const}$ are two constants, and $R_1$ and $R_2$ are normally distributed random variables following N(0,1).

In some embodiments, step (b) in step 130 is omitted, and in step 140, g is directly multiplied by the step size α; and/or
in step 150, a replacing loop termination condition is that a predetermined condition is met on a basis of measured adversarial performance; and/or
in step 210, a replacing loop termination condition is that NN performance reaches a predetermined target.

In some embodiments, in step 120, in l^∞ space where p=∞, the step size $$\alpha = \frac{1}{N_{steps}} \cdot (|\Theta| \cdot \zeta_{relative} + \zeta_{const}).$$

An NN configuration parameter training method, wherein the training method is configured in a training apparatus, and the training apparatus performs the training method to obtain network configuration parameters that can be deployed on an NN accelerator, characterized in that the training method includes following steps:
 step A: initializing the NN configuration parameters $\Theta$;
 step B: obtaining $\Theta^*$ by sampling around the NN configuration parameters $\Theta$; and
 calculating a robustness loss function $\mathcal{L}_{robust}(\Theta, \Theta^*, X, y)$, wherein step B specifically includes: obtaining $\Theta^*$ by sampling randomly within and/or on a surface of an ellipsoid surrounding the NN configuration parameters $\Theta$, or by sampling at a fixed length around the NN configuration parameters $\Theta$; and then taking a worst value or an average value as $\mathcal{L}_{robust}(\Theta, \Theta^*, X, y)$, where X is an input in a dataset, and y is a target output in a dataset;
 step C: combining $\mathcal{L}_{normal}(\Theta, X, y)$ and $\mathcal{L}_{robust}(\Theta, \Theta^*, X, y)$ and obtaining a total loss function $\mathcal{L}_{total}(\Theta, X, y)$, where $\mathcal{L}_{normal}(\Theta, X, y)$ is a target loss function;
 step D: searching for the NN configuration parameters $\Theta$ that minimize $\mathcal{L}(\Theta, X, y)$.

An NN configuration parameter training method, wherein the training method is configured in a training apparatus, and the training apparatus performs the training method to obtain network configuration parameters that can be deployed on an NN accelerator, characterized in that the training method includes following steps:
 step of an inner attacking loop including:
  maximizing, by searching for NN configuration parameters $\Theta^*$ near current NN configuration parameters $\Theta$, a difference in an NN output result between the NN configuration parameters $\Theta$ and $\Theta^*$;
  after a first predetermined condition is met, from a perspective of attacking the NN configuration parameters, obtaining the attacked NN configuration parameters $\Theta^*$, and jumping out of step of the inner attacking loop;
 step of an outer optimization loop including:
  taking a difference $\mathcal{L}_{robust}$ in the NN output result between the current NN configuration parameters $\Theta$ and the attacked NN configuration parameters $\Theta^*$ as a part of a total loss function $\mathcal{L}_{total}$, and obtaining a gradient $\nabla_\Theta \mathcal{L}_{total}$ of the total loss function with respect to the current NN configuration parameters $\Theta$;
  using an optimization method based on the gradient $\nabla_\Theta \mathcal{L}_{total}$ to search for and update the current NN configuration parameters $\Theta$ so that a value of the total loss function $\mathcal{L}_{total}$ is minimized;
  when a second predetermined condition is not met, entering step of the inner attacking loop again;
  after the second predetermined condition is met, jumping out of step of the outer optimization loop and taking the current NN configuration parameters $\Theta$ updated last as target NN configuration parameters which are final.

In some embodiments, the first predetermined condition is that a number of times of executing the inner attacking loop reaches a predetermined number of times or a predetermined condition is met on a basis of measured adversarial performance.

In some embodiments, the second predetermined condition is that a number of times of executing the outer optimization loop reaches a predetermined number of times or NN performance corresponding to the current NN configuration parameters $\Theta$ reaches a predetermined target.

In some embodiments, before entering step of the inner attacking loop, initializing all of the NN configuration parameters $\Theta^*$.

In some embodiments, in the process of searching for the NN configuration parameters $\Theta^*$, the NN configuration parameters $\Theta^*$ that are updated each time are located within or on a surface of an ellipsoid centered at the current NN configuration parameters $\Theta$.

In some embodiments, in a process of searching for the NN configuration parameters $\Theta^*$, the gradient $\nabla_{\Theta^*} \mathcal{L}_{robust}$ which is steepest is used to update the network configuration parameters $\Theta^*$, so that the NN configuration parameters $\Theta^*$ move in a direction of maximal divergence from the NN output result corresponding to the NN configuration parameters $\Theta$.

In some embodiments, step of taking the difference $\mathcal{L}_{robust}$ in the NN output result between the current NN configuration parameters $\Theta$ and the attacked NN configuration parameters $\Theta^*$ as the part of the total loss function $\mathcal{L}_{total}$ specifically is:

$\mathcal{L}_{total} = \mathcal{L}_{normal} + \beta_{rob} \cdot \mathcal{L}_{robust}$, where $\beta_{rob}$ is a weighting factor controlling influence of the robustness loss on an optimization process.

In some embodiments, the first predetermined condition is that a number of times of executing the inner attacking loop reaches a predetermined number of times or a predetermined condition is met on a basis of measured adversarial performance;

the second predetermined condition is that a number of times of executing the outer optimization loop reaches a predetermined number of times or NN performance corresponding to the current NN configuration parameters $\Theta$ reaches a predetermined target;

before entering step of the inner attacking loop, initializing all of the attacked NN configuration parameters $\Theta^*$;

in a process of searching for the NN configuration parameters $\Theta^*$, the NN configuration parameters $\Theta^*$ that are updated each time are located within or on a surface of an ellipsoid centered at the current NN configuration parameters $\Theta$;

in the process of searching for the NN configuration parameters $\Theta^*$, the gradient $\nabla_{\Theta^*} \mathcal{L}_{robust}$ which is steepest is used to update the network configuration parameters $\Theta^*$, so that the NN configuration parameters $\Theta^*$ move in a direction of maximal divergence from the NN output result corresponding to the NN configuration parameters $\Theta$;

step of taking the difference $\mathcal{L}_{robust}$ in the NN output result between the current NN configuration parameters $\Theta$ and the attacked NN configuration parameters $\Theta^*$ as the part of the total loss function $\mathcal{L}_{total}$ specifically is: $\mathcal{L}_{total} = \mathcal{L}_{normal} + \beta_{rob} \cdot \mathcal{L}_{robust}$, where $\beta_{rob}$ is a weighting factor controlling influence of the robustness loss on an optimization process.

An NN configuration parameter training method, which is performed by a training apparatus, characterized in that:

searching for NN configuration parameters $\Theta^*$ on a basis of current NN configuration parameters $\Theta$, so that the NN configuration parameters $\Theta^*$ move in a direction of maximal divergence from an NN output result corresponding to the NN configuration parameters $\Theta$;

taking a difference $\mathcal{L}_{robust}$ in an NN output result between the current NN configuration parameters $\Theta$ and the attacked NN configuration parameters $\Theta^*$ as a part of a total loss function $\mathcal{L}_{total}$;

optimizing the NN configuration parameters $\Theta$ on a basis of the total loss function $\mathcal{L}_{total}$.

In some embodiments, in a process of searching for the NN configuration parameters $\Theta^*$, the NN configuration parameters $\Theta^*$ that are updated each time are located within or on a surface of an ellipsoid centered at the current NN configuration parameters $\Theta$.

A method for training an NN of which a plurality of configuration parameters are for being deployed on an NN accelerator, wherein the method includes:

simulating an attack on the configuration parameters of the NN, wherein the simulated attack starts from the configuration parameters which are not attacked, and is reflected in a plurality of attacked configuration parameters which are virtual;

updating the configuration parameters, wherein a direction in which the configuration parameters that the simulated attack starts from are moved is determined by maximally decreasing, with respect to the configuration parameters, a first performance loss value of the NN while maximally decreasing, with respect to the configuration parameters, a robustness loss value of the NN, wherein the first performance loss value is located at the configuration parameters that the simulated attack starts from;

wherein the robustness loss value reflects a second performance loss value of the NN located at the attacked configuration parameters that reflect the simulated attack; and wherein maximally decreasing the robustness loss value includes considering a causal relationship between a move of the configuration parameters that the simulated attack starts from and a resulting move of the attacked configuration parameters that reflect the simulated attack.

In some embodiments, the robustness loss value includes a value of a change in a network output of the NN, wherein the network output is evaluated at the configuration parameters that the simulated attack starts from, and the value of the change is caused by the attacked configuration parameters that reflect the simulated attack.

In some embodiments, maximally decreasing, with respect to the configuration parameters, the first performance loss value of the NN while maximally decreasing, with respect to the configuration parameters, the robustness loss value of the NN is minimizing, with respect to the configuration parameters, a total loss function which is a function of a first performance loss function and a robustness loss function;

wherein the first performance loss function is a function of the configuration parameters, and the robustness loss function is a function of the attacked configuration parameters;

wherein an initial value of the first performance loss function for minimizing the total loss function is the first performance loss value, and an initial value of the robustness loss function for minimizing the total loss function is the robustness loss value;

wherein considering the causal relationship includes computing a partial derivative of the attacked configuration parameters with respect to the configuration parameters;

wherein the partial derivative is evaluated at the configuration parameters that the simulated attack starts from;

wherein an initial value of the attacked configuration parameters for computing the partial derivative is the attacked configuration parameters that reflect the simulated attack.

In some embodiments, the simulated attack is bounded by a bounding box, wherein each of a plurality of dimensions of the bounding box has an increasing relationship with a magnitude of a corresponding configuration parameter of the configuration parameters that the simulated attack starts from.

In some embodiments, the increasing relationship is linear.

In some embodiments, simulating the attack is performed in iterative steps, wherein each of the iterative steps includes:

moving the attacked configuration parameters that each of the iterative steps starts from by a step size;

wherein each component of the step size has the increasing relationship with the magnitude of the corresponding configuration parameter of the configuration parameters that the simulated attack starts from.

In some embodiments, projecting, onto an ellipsoid, the attacked configuration parameters which are moved, wherein the ellipsoid is centered at the configuration parameters that the simulated attack starts from and quantized by a matrix, wherein the matrix causes the increasing relationship to be kept.

A training apparatus, including: a memory; and at least one processor coupled to the memory, wherein the at least one processor is configured to perform any one of the aforementioned NN configuration parameter training methods.

A storage apparatus, wherein the storage apparatus is configured to store source code written for any one of the aforementioned NN configuration parameter training methods using a programming language and/or machine code that can be run directly on a machine.

An NN accelerator, wherein the NN configuration parameters obtained by training with any one of the aforementioned NN configuration parameter training methods are deployed on the NN accelerator.

A neuromorphic chip, wherein the NN configuration parameters obtained by training with any one of the aforementioned NN configuration parameter training methods are deployed on the neuromorphic chip.

A method for deploying NN configuration parameters, wherein the method includes: deploying the NN configuration parameters obtained by training with any one of the aforementioned NN configuration parameter training methods on an NN accelerator.

An NN configuration parameter deployment apparatus, characterized in that: the NN configuration parameters obtained by training with any one of the aforementioned NN configuration parameter training methods are stored on the NN configuration parameter deployment apparatus, and are transmitted to an NN accelerator through a channel.

The above content is generally based on the generalization of the specific embodiments, but does not exclude the disclosure of technical features/technical solutions that are not disclosed in the specific embodiments. This content also belongs to the technical features/technical solutions disclosed in the present invention. Any reasonable combination of all of the above technical features serves as the disclosure of a certain technical solution.

The present invention has at least the following advantages:

1. No additional hardware, chip-by-chip feature extraction, power consumption, cost, chip area, etc. are required. A problem of configuration parameter perturbations caused by device mismatch can be solved at only an algorithm training level. The present invention can adapt to generalized random perturbations of parameters, wherein the adaptation clears the way for high-volume commercial deployment of ultra-low-power sub-threshold chip parameter configurations.

2. The present invention is not only applicable to deployment of network parameters of neuromorphic chips with device mismatch caused by working of the neuromorphic chips in a mixed signal/sub-threshold state. In fact, the methods of the present invention can be applied to any NN accelerator in which configuration parameters are perturbed. The purpose of the present invention is not limited to protecting the mixed-signal neuromorphic chips.

3. Compared with the closest related art, the present invention has the following differences:

The present invention does not search for adversarial inputs. Thus, unnecessarily worsening an attack is avoided.

The present invention has a different loss function, and what a simulated adversary of the present invention desires to increase is a change in a network prediction, not a change in network performance.

The present invention optimizes configuration parameters through a relationship between original configuration parameters and found attacked configuration parameters.

The related art flattens configuration parameter-loss landscape for improving robustness against adversarial inputs. The present invention is for improving robustness against an attack on the configuration parameters and/or random perturbations of the configuration parameters.

The related art updates the configuration parameters through a gradient with respect to attacked parameters. This gradient implies how much an output changes if the attacked parameters are moved a little bit. It is not desirable to use this for updating normal/other configuration parameters because quality of optimization suffers and a "sub-optimality" problem is caused.

The present invention can be a trade-off between performance and robustness.

BRIEF DESCRIPTION OF DRAWINGS

FIG. 3 is a flowchart of a neural network (NN) training method in accordance with some embodiments of the present invention.

FIG. 7 is a flowchart of step of simulating an attack on configuration parameters in accordance with some other embodiments of the present invention.

FIG. 12 is a performance comparison diagram of the present invention and other algorithms.

DETAILED DESCRIPTION OF EMBODIMENTS

As used here, when at least one operation (i.e., at least one verb) that is performed is referred to as "using", "from", "on", "based on", or "on a/the basis of" at least one object (i.e., at least one object of the at least one verb), the at least one operation is performed "directly using", "directly from", "directly on", "directly based on", or "directly on a/the basis of" the at least one object, or at least one intervening operation can be present.

Figure 1:
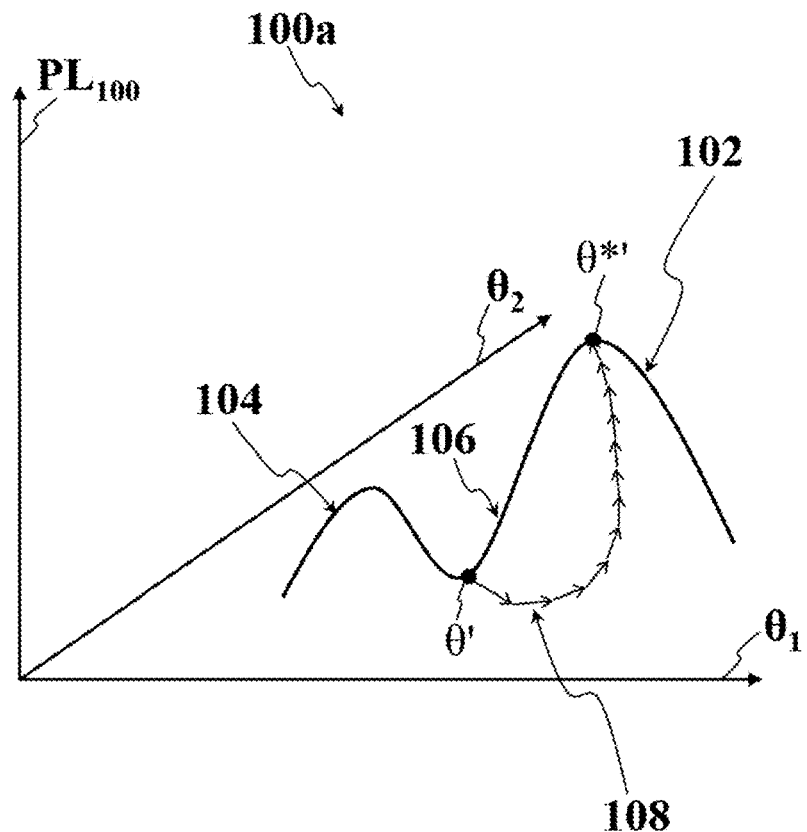
FIG. 1 is a network configuration parameter space performance loss landscape in accordance with the related art.
Figure 2:
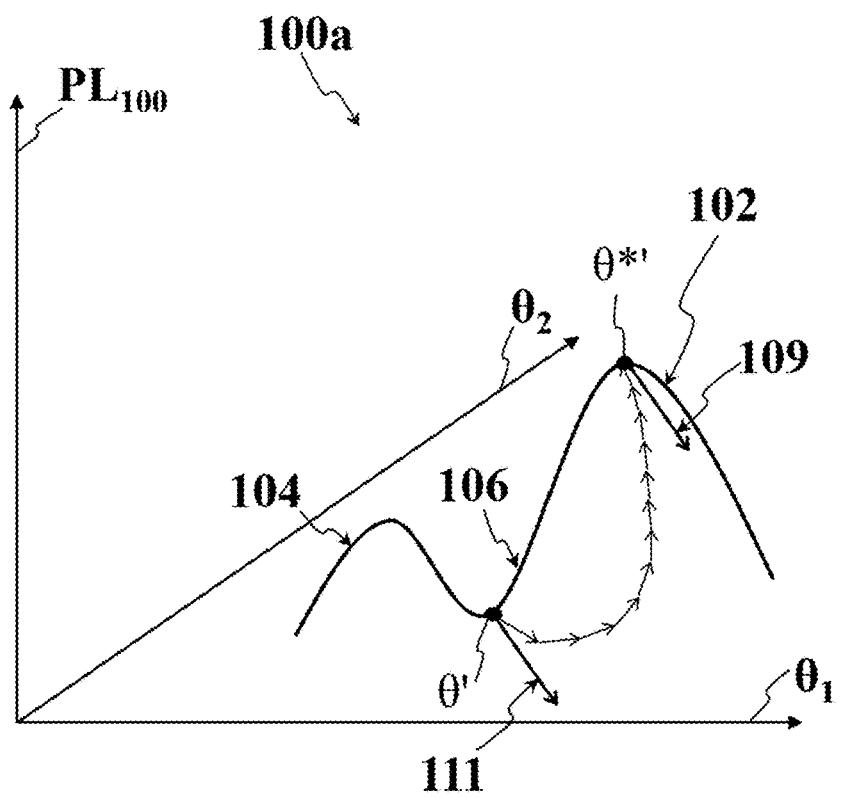
FIG. 2 is a network configuration parameter space performance loss landscape related to a parameter update in accordance with the related art.

FIG. 1 is a schematic diagram of a network configuration parameter space performance loss landscape 100 for illustrating step of simulating an attack on configuration parameters of a neural network (NN) in accordance with the related art 1. FIG. 2 is a schematic diagram of a network configuration parameter space performance loss landscape 100 for illustrating step of updating the configuration parameters of the NN in accordance with the related art 1. Referring to FIGS. 1 and 2, in the network configuration parameter space performance loss landscape 100, $\theta$ is an exemplary network configuration parameter vector (i.e., the parameters of the NN) in a two-dimensional vector space, $\theta_1$ is a first component of $\theta$ and is plotted on an x-axis, and $\theta_2$ is a second component of $\theta$ and is plotted on a y-axis. A performance loss function $PL_{100}$ is plotted on a z-axis. The loss landscape 100 has a high hill 102, a low hill 104, and a valley 106 between the high hill 102 and the low hill 104. In FIGS. 1 and 2, points respectively illustrated for configuration parameters $\theta'$ and attacked configuration parameters $\theta^{*'}$ are labeled as $PL_{100}$ ($\theta'$) and $PL_{100}$ ($\theta^{*'}$) below, respectively, and are sometimes labeled only as $\theta'$ and $\theta^{*'}$, respectively, for simplicity purpose.

Referring to FIG. 1, in the related art 1, given a plurality of configuration parameters $\theta'$ of the NN obtained from a previous iteration of optimizing the NN for performance, for a current iteration of optimizing the NN for performance, an attack on the configuration parameters $\theta$ of the NN is simulated starting from the configuration parameters $\theta'$ which are not attacked. The simulation is performed on a plurality of attacked configuration parameters $\theta^*$ which are virtual. The attacked configuration parameters $\theta^*$ are initially located at the configuration parameters $\theta'$ which are not attacked, and are located at the valley 106. After a few iterative simulation steps that result in respective moves 108 of the attacked configuration parameters $\theta^*$, the attacked configuration parameters $\theta^*$ become located at attacked configuration parameters $\theta^*$ that reflect the simulated attack and are located at the high hill 102.

Referring to FIG. 2, then, in the related art 1, the configuration parameters $\theta$ are updated by performing the following steps. A gradient of the performance loss function of the NN evaluated at the attacked configuration parameters $PL_{100}$ ($\theta^{*'}$) (i.e., a performance loss value $PL_{100}$ ($\theta^{*'}$)) is calculated, wherein the attacked configuration parameters $\theta^{*'}$ reflect the simulated attack, and the gradient is with respect to the attacked configuration parameters $\theta^*$. An opposite direction 108 of the gradient of the performance loss value $PL_{100}$ ($\theta^{*'}$) of the NN with respect to the attacked configuration parameters $\theta^*$ is used as a direction 110 for moving the configuration parameters $\theta'$ for updating the configuration parameters $\theta$.

Because the opposite direction 108 of the gradient of the performance loss value $PL_{100}$ ($\theta^{*'}$) with respect to the attacked configuration parameters $\theta^*$ is a direction of steepest descent from the performance loss value $PL_{100}$ ($\theta^{*'}$) located at the attacked configuration parameters $\theta^{*'}$ that reflect the simulated attack, only an impact of moving the attacked configuration parameters $\theta^{*'}$ on the performance loss value $PL_{100}$ ($\theta^{*'}$) is considered for updating the configuration parameters $\theta$. This can lead to sub-optimality because it is assumed that the direction in which the attacked configuration parameters $\theta^{*'}$ have to be moved in order to reduce the performance loss value $PL_{100}$ ($\theta^{*'}$) is same direction in which the configuration parameters $\theta'$ have to be moved in order to combat the attack.

In accordance with some embodiments of the present invention to be described with reference to FIG. 3, because an NN trained to be deployed on a plurality mixed-signal NN chips for implementing a corresponding plurality of NN accelerators can be attacked randomly by device-mismatch, during training the NN, an attack on a plurality of configuration parameters of the NN is simulated by an adversary. The simulation is performed on a plurality of attacked configuration parameters which are virtual. In this way, the simulated attack and the combat of the simulated attack can be systematic. The related art 1 simulates the attack of the configuration parameters using the attacked configuration parameters $\theta^*$ which are virtual, but for updating the configuration parameters $\theta$, the related art 1 only considers an impact of a move on the performance loss value $PL_{100}$ ($\theta^{*'}$), wherein the move is a move of the attacked configuration parameters $\theta^{*'}$ that reflect the simulated attack. This deficiency of the related art 1 is improved in the embodiments to be described with reference to FIG. 3 by considering a causal relationship between a move of the configuration parameters that the simulated attack starts from and a resulting move of the attacked configuration parameters that reflect the simulated attack, wherein the consideration of the causal relationship is called propagating through the adversary. In this way, both impacts of updating the configuration parameters on a first performance loss value of the NN located at configuration parameters that the simulated attack starts from and a second performance loss value of the NN located at the attacked configuration parameters that reflect the simulated attack can be considered.

FIG. 3 is a flowchart of a routine of training an NN to be deployed on a plurality of mixed-signal NN chips for implementing a corresponding plurality of NN accelerators in accordance with some embodiments of the present invention. The routine 300 includes the following steps performed by at least one processor of a training apparatus.

In step 302, an attack on a plurality of configuration parameters of an NN is simulated starting from the configuration parameters which are not attacked. The simulated attack is reflected in a plurality of attacked configuration parameters which are virtual.

In step 304, the configuration parameters are updated. A direction in which the configuration parameters that the simulated attack starts from are moved is determined by maximally decreasing, with respect to the configuration parameters, a first performance loss value of the NN while maximally decreasing, with respect to the configuration parameters, a robustness loss value of the NN. The first performance loss value is located at the configuration parameters that the simulated attack starts from. The robustness loss value reflects a second performance loss value of the NN evaluated at the attacked configuration parameters that reflect the simulated attack. Maximally decreasing the robustness loss value includes considering a causal relationship between a move of the configuration parameters that the simulated attack starts from and a resulting move of the attacked configuration parameters that reflect the simulated attack.

Figure 4:
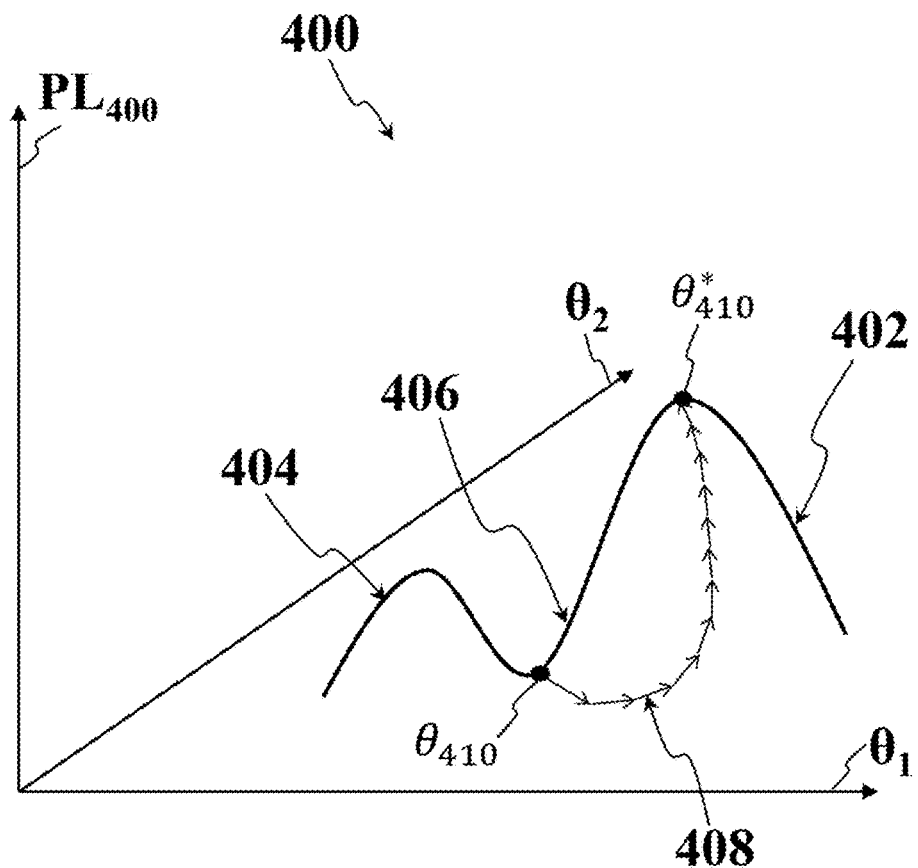
FIG. 4 is a network configuration parameter space performance loss landscape related to an attack in accordance with some embodiments of the present invention.
Figure 5:
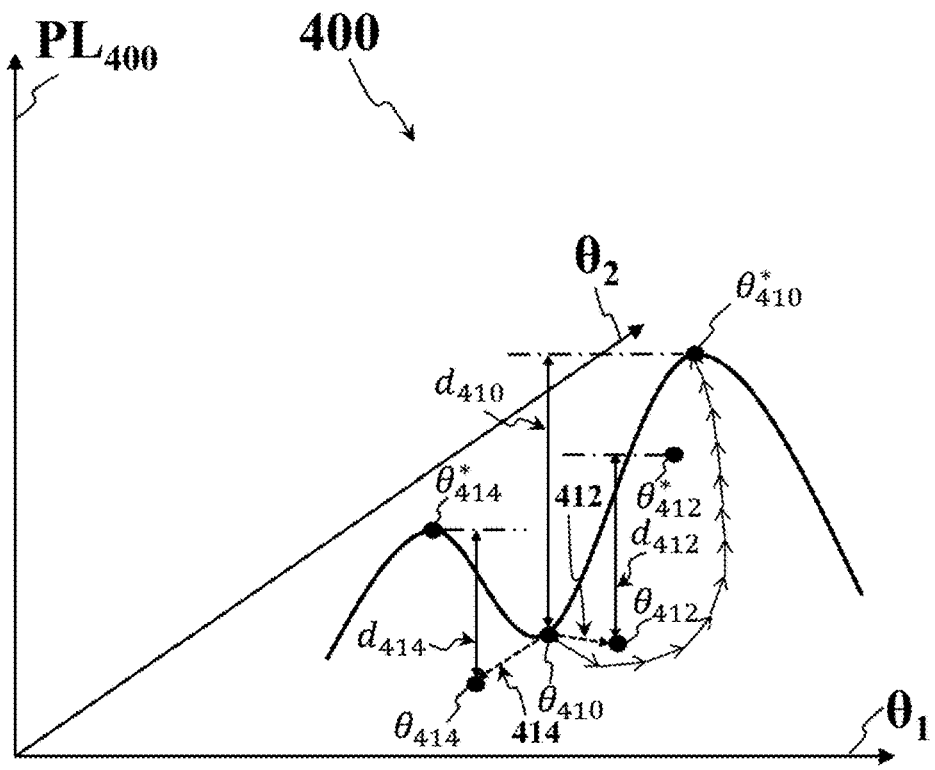
FIG. 5 is a network configuration parameter space performance loss landscape related to a parameter update in accordance with some embodiments of the present invention.

FIG. 4 is a schematic diagram of a network configuration parameter space performance loss landscape 400 for illustrating step 302 of simulating an attack on configuration parameters of the NN in accordance with the first embodiment. FIG. 5 is a schematic diagram of a network configuration parameter space performance loss landscape 400 for illustrating step 304 of updating the configuration parameters of the NN in accordance with the embodiments described with reference to FIG. 3. Referring to FIGS. 4 and 5, in the network configuration parameter space performance loss landscape 400, θ is an exemplary network configuration parameter vector (i.e., the parameters of the NN) in a two-dimensional vector space, $θ_1$ is a first component of θ and is plotted on an x-axis, and $θ_2$ is a second component of θ and is plotted on a y-axis. A performance loss function $PL_{400}$ is plotted on a z-axis. The loss landscape 400 has a high hill 402, a low hill 404, and a valley 406 between the high hill 402 and the low hill 404. In FIGS. 4 and 5, points respectively illustrated for configuration parameters $θ_{410}$, configuration parameters $θ_{412}$, configuration parameters $θ_{414}$, attacked configuration parameters $θ_{410}{}^*$, attacked configuration parameters $θ_{412}{}^*$, and attacked configuration parameters $θ_{414}{}^*$ to be described below are labeled as $PL_{400}(θ_{410})$, $PL_{400}(θ_{412})$, $PL_{400}(θ_{414})$, $PL_{400}(θ_{410}{}^*)$, $PL_{400}(θ_{412}{}^*)$, and $PL_{400}(θ_{414}{}^*)$, respectively, and are also labeled as $θ_{410}$, $θ_{412}$, $θ_{414}$, $θ_{410}{}^*$, $θ_{412}{}^*$, and $θ_{414}{}^*$, respectively, for simplicity purpose.

Referring to FIG. 4, in the embodiments described with reference to FIG. 3, given a plurality of configuration parameters $θ_{410}$ of the NN initialized or obtained from a previous iteration of optimizing the NN, for a current iteration of optimizing the NN, in step 302, an attack on a plurality of configuration parameters θ of the NN is simulated starting from the configuration parameters $θ_{410}$ which are not attacked. The simulation is performed on a plurality of attacked configuration parameters θ* which are virtual. The attacked configuration parameters θ* are initially located at the configuration parameters $θ_{410}$ which are not attacked, and are located at the valley 406. After a few iterative simulation steps that result in respective moves 408 of the attacked configuration parameters θ*, the attacked configuration parameters θ* become located at attacked configuration parameters $θ_{410}{}^*$ that reflect the simulated attack and are located at the high hill 402.

Referring to FIG. 5, in step 304, the configuration parameters are updated. A direction in which the configuration parameters $θ_{410}$ that the simulated attack starts from are moved is determined by maximally decreasing, with respect to the configuration parameters θ, a first performance loss value $PL_{400}(θ_{410})$ of the NN while maximally decreasing, with respect to the configuration parameters θ, a robustness loss value $d_{414}$ of the NN. The first performance loss value $PL_{400}(θ_{410})$ is evaluated at the configuration parameters $θ_{410}$ that the simulated attack starts from. The robustness loss value $d_{414}$ reflects a second performance loss value $PL_{400}(θ_{410}{}^*)$ of the NN located at the attacked configuration parameters $θ_{410}{}^*$ that reflect the simulated attack. Maximally decreasing the robustness loss value includes considering a causal relationship between a move of the configuration parameters 8410 that the simulated attack starts from and a resulting move of the attacked configuration parameters $θ_{410}{}^*$ that reflect the simulated attack.

In the example in FIG. 5, the robustness loss value $d_a$ of the NN is illustratively a vertical distance between a performance loss value $PL_{400}(θ_a)$ located at configuration parameters $θ_a$ and a performance loss value $PL_{400}(θ_a{}^*)$ located at corresponding attacked configuration parameters $θ_a{}^*$. Because in step 304, the first performance loss value $PL_{400}(θ_{410})$ is maximally decreased and at a same time, the robustness loss value $d_{410}$ that reflects the second performance loss value $PL_{400}(θ_{410}{}^*)$ is maximally decreased, optimization for the configuration parameters θ initially starts at the first performance loss value $PL_{400}(θ_{410})$ and the robustness loss value $d_{410}$ that reflects the second performance loss value $PL_{400}(θ_{410}{}^*)$.

Then, a plurality of exemplary candidate moves 412 and 414 of the configuration parameters $θ_{410}$ that the simulated attack starts from are evaluated. For both the candidate moves 412 and 414, corresponding first performance loss values $PL_{400}(θ_{412})$ and $PL_{400}(θ_{414})$ are decreased. Because in step 304, a causal relationship between a move of the configuration parameters $θ_{410}$ that the simulated attack starts from and a resulting move of the attacked configuration parameters $θ_{410}{}^*$ that reflect the simulated attack is considered, when the configuration parameters $θ_{410}$ that the simulated attack starts from are moved to candidate configuration parameters $θ_{412}$, an attack on the configuration parameters θ does not have to be simulated starting from the candidate configuration parameters $θ_{412}$, and how the attacked configuration parameters $θ_{410}{}^*$ that reflect the simulated attack move is determined by the causal relationship for the move to the candidate configuration parameters $θ_{412}$. In this case, the attacked configuration parameters $θ_{410}{}^*$ that reflect the simulated attack are moved to candidate attacked configuration parameters $θ_{412}{}^*$. Then, a robustness loss value $d_{412}$ which is a vertical difference between a first performance loss value $PL_{400}(θ_{412})$ located at the candidate configuration parameters $θ_{412}$ and a second performance loss value $PL_{400}(θ_{412}{}^*)$ located at the corresponding candidate attacked configuration parameters $θ_{412}{}^*$ can be calculated. Similarly, when the configuration parameters $θ_{410}$ that the simulated attack starts are moved to candidate configuration parameters $θ_{414}$, how the attacked configuration parameters $θ_{410}{}^*$ that reflect the simulated attack move is determined by the causal relationship for the move to the candidate configuration parameters $θ_{414}$. In this case, the attacked configuration parameters $θ_{414}{}^*$ that reflect the simulated attack are moved to candidate attacked configuration parameters $θ_{414}{}^*$. Then, a robustness loss value $d_{414}$ which is a vertical difference between a first performance loss value $PL_{400}(θ_{414})$ located at the candidate configuration parameters $θ_{414}$ and a second performance loss value $PL_{400}(θ_{414}{}^*)$ located at the corresponding candidate attacked configuration parameters $θ_{414}{}^*$ can be calculated. Compared with the robustness loss value $d_{410}$, both the robustness loss value $d_{412}$ and the robustness loss value $d_{414}$ are less. Further, the robustness loss value $d_{414}$ is less than the robustness loss value $d_{412}$. Thus, the candidate move 414 is chosen.

By considering the causal relationship between the move of the configuration parameters $θ_{410}$ that the simulated attack starts from and the resulting move of the attacked configuration parameters $θ_{410}{}^*$ that reflect the simulated attack, both impacts of updating the configuration parameters θ on the first performance loss value $PL_{400}(θ_{410})$ of the NN located at configuration parameters $θ_{410}$ that the simulated attack starts from and the second performance loss value $PL_{400}(θ_{410}{}^*)$ of the NN located at the attacked configuration parameters $θ_{410}{}^*$ that reflect the simulated attack can be considered.

Figure 6:
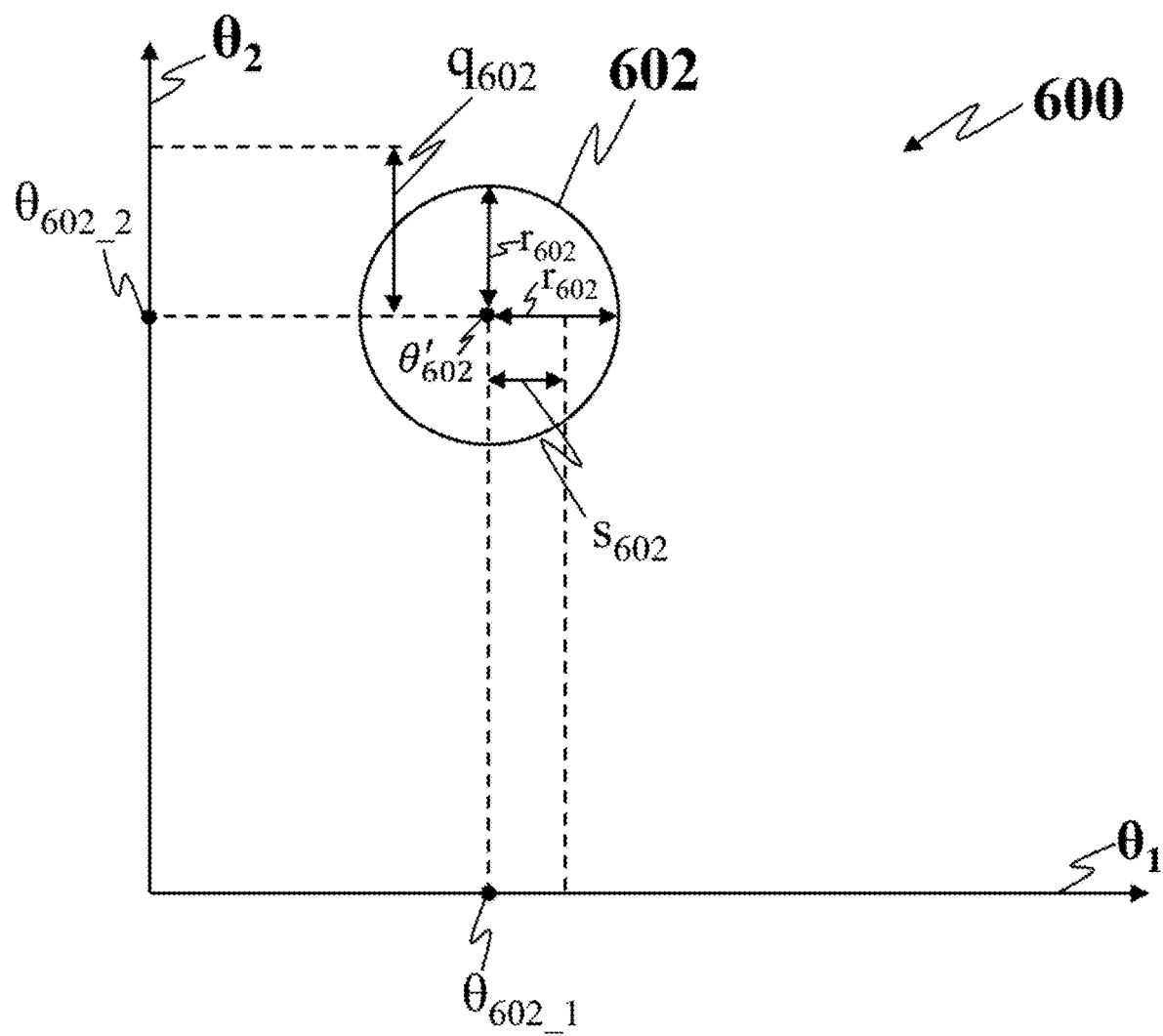
FIG. 6 is a schematic diagram of a parameter space for illustrating a bounding box in which an attack on configuration parameters is simulated in accordance with the related art.

FIG. 6 is a schematic diagram of a parameter space for illustrating a bounding box in which the attack on the configuration parameters of the NN is simulated in accordance with the related art 1. Referring to FIG. 6, a parameter space 600 is a parameter space in the network configuration parameter space performance loss landscape 100 in FIG. 1. The parameter space in the network configuration parameter space performance loss landscape 100 is the two-dimensional vector space in which the configuration parameters θ is located. Thus, for the parameter space 600, the first component $\theta_1$ of the configuration parameters $\theta$ is plotted on the x-axis, and the second component $\theta_2$ of the configuration parameters $\theta$ is plotted on the y-axis.

Referring to FIG. 6, in the related art 1, in step described with reference to FIG. 1, the attack on the configuration parameters $\theta$ of the NN is simulated starting from the configuration parameters $\theta'$ which are not attacked. The attacked configuration parameters $\theta^*$ are initially located at the configuration parameters $\theta'$ which are not attacked. In the example in FIG. 6, the configuration parameters $\theta'$ are the configuration parameters $\theta_{602}'$. The respective moves 108 (illustrated in FIG. 1) of the attacked configuration parameters $\theta^*$ are bounded by a bounding box 602. Thus, the simulated attack is bounded by the bounding box 602. The bounding box 602 has a circular shape with a center at the configuration parameters $\theta_{602}'$. A radius $r_{602}$ of the bounding box 602 is proportional to $$\sqrt{\theta_{602\_1}^2 + \theta_{602\_2}^2},$$

where $\theta_{602\_1}$ is the first component of the configuration parameters $\theta_{602}'$ and $\theta_{602\_2}$ is the second component of the configuration parameters $\theta_{602}'$.

For the configuration parameters $\theta_{602}'$, a magnitude of the first component $\theta_{602\_1}$ of the configuration parameters $\theta_{602}'$ is less than a magnitude of the second component $\theta_{602\_2}$ of the configuration parameters $\theta_{602}'$. Thus, in a real-world situation, a maximal magnitude $s_{602}$ that is of a perturbation and can be added to the first component $\theta_{602\_1}$ of the configuration parameters $\theta_{602}'$ should be less than a maximal magnitude $q_{602}$ that is of a perturbation and can be added to the second component $\theta_{602\_2}$ of the configuration parameters $\theta_{602}'$. However, because the simulated attack is bounded by the bounding box 602, a maximal magnitude that is of a perturbation and can be added to the first component $\theta_{602\_1}$ of the configuration parameters $\theta_{602}'$ is the radius $r_{602}$ that is more than the magnitude $s_{602}$ and is thus too bad to be true. And a maximal magnitude that is of a perturbation and can be added to the second component $\theta_{602\_2}$ of the configuration parameters $\theta_{602}'$ is also the radius $r_{602}$ that is less than the magnitude $q_{602}$ and is thus too good to be true.

In accordance with some embodiments of the present invention to be described with reference to FIG. 7, the deficiency of the simulated attack being bounded by a bounding box (exemplarily illustrated in FIG. 6 as the bounding box 602 for the related art 1) insufficient for the simulated attack to reflect the real-world situation is improved. The improvement is achieved by using a bounding box that has dimensions each of which has an increasing relationship with a magnitude of a corresponding configuration parameter of the configuration parameters that the simulated attack starts from.

FIG. 7 is a flowchart of step of simulating an attack on configuration parameters of the NN in accordance with some embodiments of the present invention. In the embodiments described with reference to FIG. 7, step 302 in the routine 300 in FIG. 3 further becomes step 702. The embodiments described with reference to FIG. 7 are based on the embodiments described with reference to FIG. 3 and thus same content as the embodiments described with reference to FIG. 3 is omitted here.

In step 702, an attack on a plurality of configuration parameters of an NN is simulated starting from the configuration parameters which are not attacked. The simulated attack is reflected in a plurality of attacked configuration parameters which are virtual. The simulated attack is bounded by a bounding box, wherein each of a plurality of dimensions of the bounding box has an increasing relationship with a magnitude of a corresponding configuration parameter of the configuration parameters that the simulated attack starts from.

Figure 8:
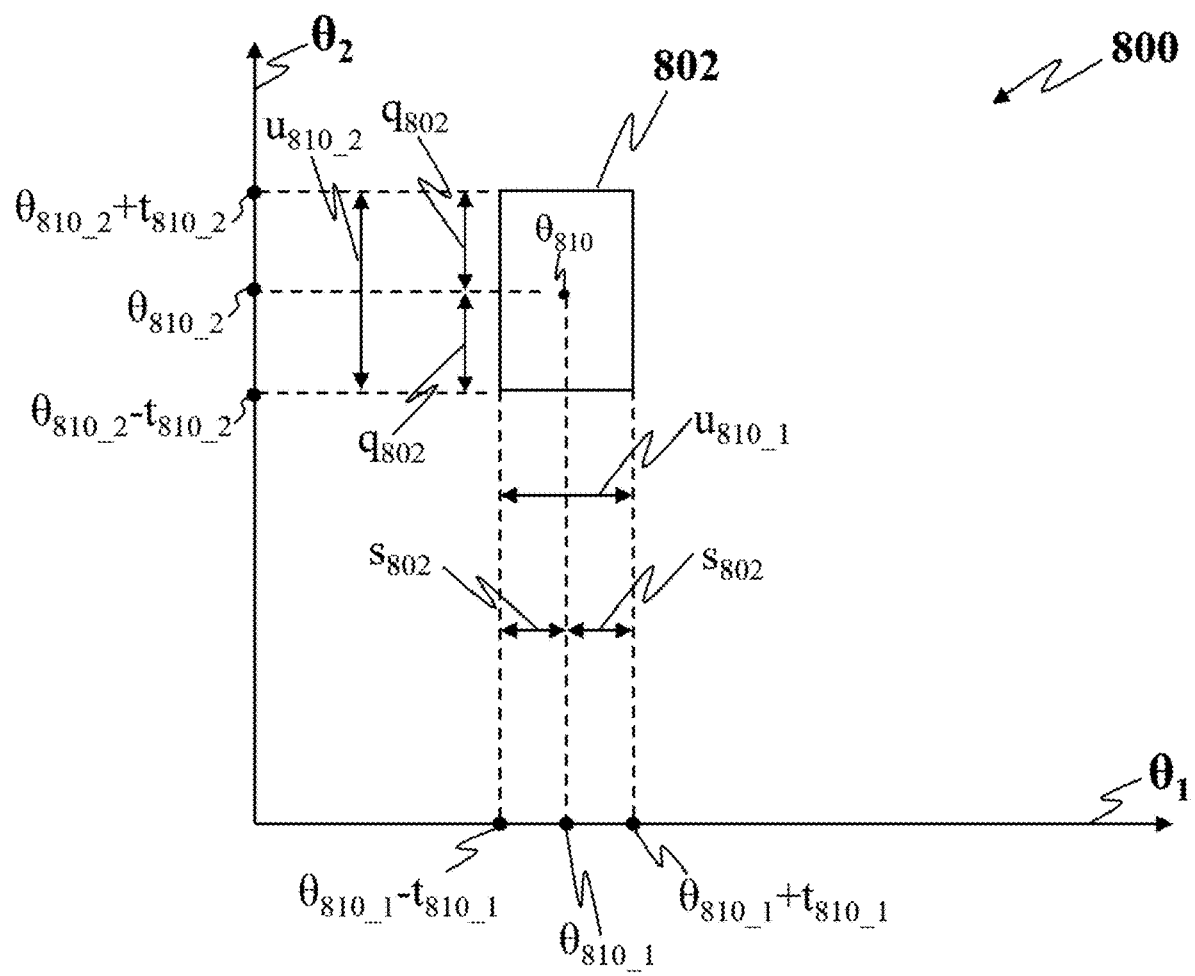
FIG. 8 is a schematic diagram of a parameter space for illustrating a bounding box in which the attack on the configuration parameters is simulated in accordance with some other embodiments of the present invention.

FIG. 8 is a schematic diagram of a parameter space for illustrating a bounding box in which the attack on the configuration parameters of the NN is simulated in accordance with the embodiments described with reference to FIG. 7. Referring to FIG. 8, a parameter space 800 is a parameter space in the parameter space performance loss landscape 400 in FIG. 4. The parameter space in the parameter space performance loss landscape 400 is the two-dimensional vector space in which the configuration parameters $\theta$ is located. Thus, for the parameter space 800, the first component $\theta_1$ of the configuration parameters $\theta$ is plotted on the x-axis, and the second component $\theta_2$ of the configuration parameters $\theta$ is plotted on the y-axis.

Referring to FIG. 4, in the embodiments described with reference to FIG. 3, the configuration parameters $\theta_{410}$ of the NN initialized or obtained from the previous iteration of optimizing the NN are given. In the example in FIG. 8, the configuration parameters $\theta_{400}$ are the configuration parameters $\theta_{810}$. For a current iteration of optimizing the NN, in step 702, an attack on a plurality of configuration parameters $\theta$ of an NN is simulated starting from the configuration parameters $\theta_{810}$ which are not attacked. The simulation is performed on a plurality of attacked configuration parameters $\theta^*$ which are virtual. The attacked configuration parameters $\theta^*$ are initially located at the configuration parameters $\theta_{810}$ which are not attacked. After a few iterative simulation steps that result in respective moves 408 (illustrated in FIG. 4) of the attacked configuration parameters $\theta^*$, the attacked configuration parameters $\theta^*$ become located at attacked configuration parameters $\theta_{810}^*$ (not illustrated) that reflect the simulated attack. The respective moves 408 (of the attacked configuration parameters $\theta^*$ are bounded by a bounding box 802. Thus, the simulated attack is bounded by the bounding box 802. The bounding box 802 illustratively has a rectangular shape with a center at the configuration parameters $\theta_{810}$. For a dimension $u_{810\_1}$ that is of the bounding box 802 and corresponds to the configuration parameter $\theta_{810\_1}$ (i.e., a first component) of the configuration parameters $\theta_{810}$, a maximal magnitude that is of a perturbation and can be added to the configuration parameter $\theta_{810\_1}$ is $t_{810\_1}$. A maximal magnitude that is of a perturbation and can be subtracted from the configuration parameter $\theta_{810\_1}$ is also $t_{810\_1}$. The dimension $u_{810\_1}$ of the bounding box 802 is equal to $2*t_{810\_1}$. Similarly, a dimension $u_{810\_2}$ that is of the bounding box 802 and corresponds to the configuration parameter $\theta_{810\_2}$ (i.e., a second component) of the configuration parameters $\theta_{810}$ is equal to $2*t_{810\_2}$.

The maximal magnitude $t_{810\_1}$ of the perturbation has an increasing relationship with a magnitude of the configuration parameter $\theta_{810\_1}$. Also, the maximal magnitude $t_{810\_2}$ of the perturbation has an increasing relationship with a magnitude of the configuration parameter $\theta_{810\_2}$. Because the magnitude of the configuration parameter $\theta_{810\_1}$ is less than the magnitude of the configuration parameter $\theta_{810\_2}$, the maximal magnitude $t_{810\_1}$ of the perturbation is less than the maximal magnitude $t_{810\_2}$ of the perturbation. Thus, the dimension $u_{810\_1}$ of the bounding box 802 is less than the dimension $u_{810\_2}$ of the bounding box 802. Briefly, each of the dimensions of the bounding box 802 has an increasing relationship with a magnitude of a corresponding configuration parameter of the configuration parameters $\theta_{810}$ that the simulated attack starts from.

As used here, when a dependent variable "has an increasing relationship with" an independent variable, if the independent variable increases, the dependent variable also increases. If the independent variable decreases, the dependent variable also decreases. For example, the dependent variable can have a linear increasing relationship with the independent variable. For another example, the dependent variable can have a non-linear increasing relationship with the independent variable.

For illustration purpose, in this way, the maximal magnitude $t_{810\_1}$ of the perturbation is approximately same as the maximal magnitude $s_{802}$ that is of a real-world perturbation and can be added to or subtracted from the configuration parameter $\theta_{810\_1}$. The maximal magnitude $t_{810\_2}$ of the perturbation is approximately same as the maximal magnitude $q_{802}$ that is of a real-world perturbation and can be added to or subtracted from the configuration parameter $\theta_{810\_2}$. As to be described with reference to FIG. 10, to refine the respective maximal magnitudes of the perturbations to better approximate the respective maximal magnitudes of the real-world perturbations, projection in step 140 is performed.

Figure 9:
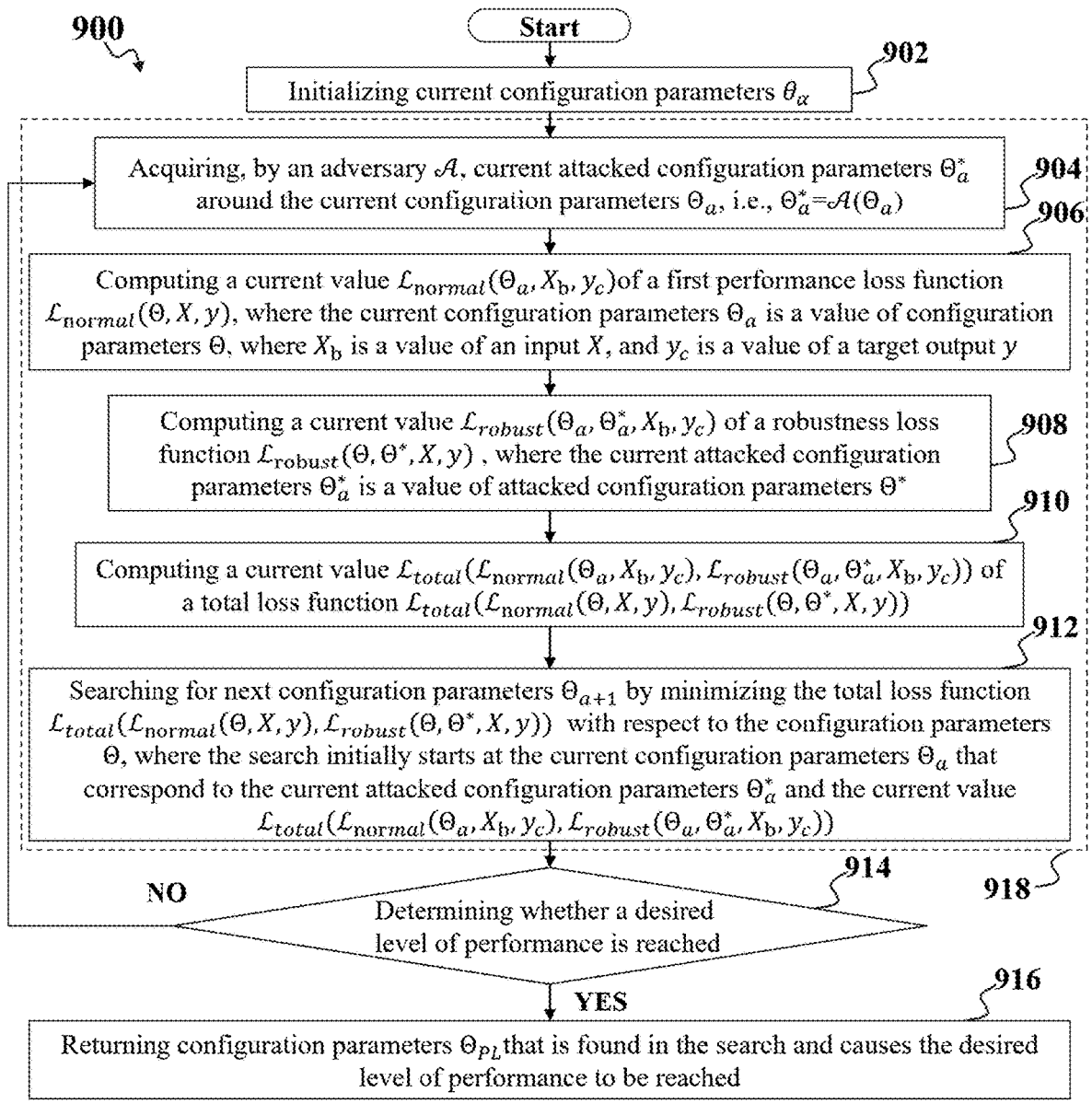
FIG. 9 is a flowchart of an NN training method in accordance with still some other embodiments of the present invention.

FIG. 9 is a flowchart of a method of training the NN to be deployed on the mixed-signal NN chips for implementing the corresponding NN accelerators in accordance with some embodiments of the present invention. Referring to FIG. 9, the method 900 includes a routine 918 which corresponds to the routine 300 in FIG. 3. The routine 918 includes step 904 that includes step 302 in FIG. 3, and steps 906 to 912 that include step 304 in FIG. 3. The method 900 iteratively executes the routine 918 until a condition in step 914 is satisfied. The routine 918 is for any update of the configuration parameters. That is, the method 900 further includes an initializing step 902 that causes a current update of the configuration parameters achieved by executing the routine 918 immediately after step 902 to be the first update of the configuration parameters. The method 900 further includes, when the condition in step 914 is not satisfied, causing the current update of the configuration parameters to become a previous update of the configuration parameters so that the routine 918 can be repeated for a current update that is of the configuration parameters and refines the previous update of the configuration parameters, and so on. The method 900 further includes, when the condition in step 914 is satisfied, causing a current update of the configuration parameters achieved by executing the routine 918 immediately before the condition in step 914 is satisfied to be a final update of the configuration parameters in step 916.

In step 902, current configuration parameters $\Theta_a$ are initialized.

In step 904, current attacked configuration parameters $\Theta_a$ around the current configuration parameters $\Theta_a$ are acquired by an adversary $\mathcal{A}$, i.e., $\Theta_a^* = \mathcal{A}(\Theta_a)$. The adversary $\mathcal{A}$ simulates the attack in step 302. The current configuration parameters $\Theta_a$ are the configuration parameters that the simulated attack starts from in step 302. The current attacked configuration parameters $\Theta_a^*$ are the attacked configuration parameters that reflect the simulated attack in step 302.

In step 906, a current value $\mathcal{L}_{normal}(\Theta_a, X_b, y_c)$ of a first performance loss function $\mathcal{L}_{normal}(\Theta, X, y)$ is computed, where the current configuration parameters $\Theta$, where $X_b$ is a value of an input X, and $y_c$ is a value of a target output y. The current value $\mathcal{L}_{normal}(\Theta_a, X_b, y_c)$ of the first performance loss function $\mathcal{L}_{normal}(\Theta, X, y)$ is the first performance loss value that is located at the configuration parameters that the simulated attack starts in step 304.

In step 908, a current value $\mathcal{L}_{robust}(\Theta_a, \Theta_a^*, X_b, y_c)$ of a robustness loss function $\mathcal{L}_{robust}(\Theta, \Theta^*, X, y)$ is computed, where the current attacked configuration parameters $\Theta_a^*$ is a value of attacked configuration parameters $\Theta^*$. The current value $\mathcal{L}_{robust}(\Theta_a, \Theta_a^*, X_b, y_c)$ of a robustness loss function $\mathcal{L}_{robust}(\Theta, \Theta^*, X, y)$ is the robustness loss value that reflects the second performance loss value located at the attacked configuration parameters that reflect the simulated attack in step 304. How the robustness loss value reflects the second performance loss value is to be described in step 912.

In step 910, a current value $\mathcal{L}_{total}(\mathcal{L}_{normal}(\Theta_a, X_b, y_c), \mathcal{L}_{robust}(\Theta_a, \Theta_a^*, X_b, y_c))$ of a total loss function $\mathcal{L}_{total}(\mathcal{L}_{normal}(\Theta, X, y), \mathcal{L}_{robust}(\Theta, \Theta^*, X, y))$ is computed.

In step 912, next configuration parameters $\Theta_{a+1}$ are searched for by minimizing the total loss function $\mathcal{L}_{total}(\mathcal{L}_{normal}(\Theta, X, y), \mathcal{L}_{robust}(\theta, \Theta^*, X, y))$ with respect to the configuration parameters $\Theta$, where the search initially starts at the current configuration parameters $\Theta_a$ that correspond to the current attacked configuration parameters $\Theta_a^*$ and the current value $\mathcal{L}_{total}(\mathcal{L}_{normal}(\Theta_a, X_b, y_c), \mathcal{L}_{robust}(\Theta_a, \Theta_a^*, X_b, y_c))$. The next configuration parameters $\Theta_{a+1}$ are the updated configuration parameters in step 304. Searching, initially starting at the current configuration parameters $\Theta_a$, for the next configuration parameters $\Theta_{a+1}$ includes determining the direction in which the configuration parameters that the simulated attack starts from are moved in step 304. Minimizing the total loss function $\mathcal{L}_{total}(\mathcal{L}_{normal}(\Theta, X, y), \mathcal{L}_{robust}(\Theta, \Theta^*, X, y))$ with respect to the configuration parameters, where the current value $\mathcal{L}_{total}(\mathcal{L}_{normal}(\Theta_a, X_b, y_c), \mathcal{L}_{robust}(\Theta_a, \Theta_a^*, X_b, y_c))$ is an initial value for the minimization, includes maximally decreasing, with respect to the configuration parameters, the first performance loss value while maximally decreasing, with respect to the configuration parameters, the robustness loss value in step 304. When the total loss function $\mathcal{L}_{total}(\mathcal{L}_{normal}(\Theta, X, y), \mathcal{L}_{robust}(\Theta, \Theta^*, X, y))$ is minimized with respect to the configuration parameters $\Theta$, a part of the minimization corresponding to the robustness loss function $\mathcal{L}_{robust}(\Theta, \Theta^*, X, y)$ causes a partial derivative $$\frac{\partial \Theta^*}{\partial \Theta}$$

to be computed. The partial derivative $$\frac{\partial \Theta^*}{\partial \Theta}$$

is evaluated at current configuration parameters $\Theta_a$. An initial value of the attacked configuration parameters for computing the partial derivative $$\frac{\partial \Theta^*}{\partial \Theta}$$

is the current attacked configuration parameters $\Theta_a^*$.

Figure 10:
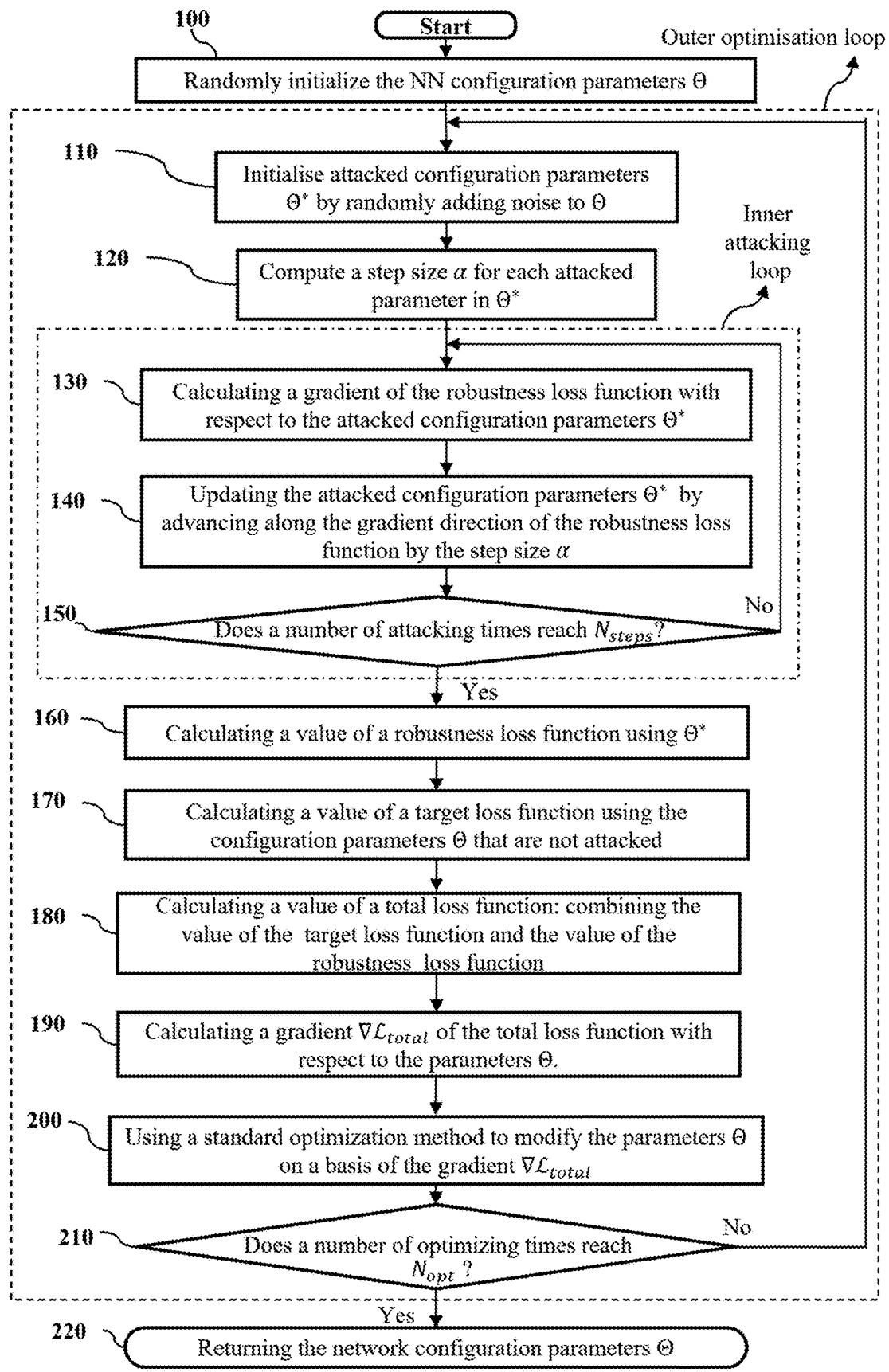
FIG. 10 is a flowchart of an NN training method in accordance with still some other embodiments of the present invention.

Because a part of the minimization of the total loss function $\mathcal{L}_{total}(\mathcal{L}_{normal}(\Theta, X, y), \mathcal{L}_{robust}(\Theta, \Theta^*, X, y))$ involves the first performance loss function $\mathcal{L}_{normal}(\Theta, X, y)$, and the robustness loss function $\mathcal{L}_{robust}(\Theta, \Theta^*, X, y)$ is a change in a network output as to be described in step 130 in FIG. 10, the current value $\mathcal{L}_{robust}(\Theta_a, \Theta_a, X_b, y_c)$ of the robustness loss function $\mathcal{L}_{robust}(\Theta, \Theta^*, X, y)$ is the robustness loss value that indirectly reflects the second performance loss value located at the attacked configuration parameters that reflect the simulated attack in step 304.

Alternatively, the robustness loss function directly reflects a second performance loss $\mathcal{L}_{normal}(\Theta+e, X, y)$, where e is perturbations added to the configuration parameters $\Theta$. Thus, in step 912 in FIG. 9, a part of minimization corresponding to the robustness loss function $\mathcal{L}_{normal}(\Theta+e, X, y)$ causes $$\frac{\partial(\Theta+e)}{\partial \Theta}$$

to be computed.

In step 914, whether a desired level of performance is reached is determined. If not, the next configuration parameters $\Theta_{a+1}$ in step 912 become current configuration parameters $\Theta_{a+1}$ and the routine 918 is repeated. If so, the next configuration parameters $\Theta_{a+1}$ in step 912 become configuration parameters $\Theta_{PL}$ that is found in the search and causes the desired level of performance to be reached in step 916.

Referring to FIG. 10, FIG. 10 illustrates some embodiments of the present invention, but this does not mean that all steps and details are necessary. Replacement, omission, order reversal and combination or mergence of steps and details are possible. The embodiments include the following steps:

step 100: initializing the NN configuration parameters $\Theta$.

The method is any suitable initializing technique in machine learning. The initial network configuration $\Theta_0$ is used to initialize the network configuration $\Theta$: $\Theta \leftarrow \Theta_0$.

In the present invention, the NN configuration parameters include, but are not limited to, a weight, a time constant, a threshold, etc.

For example, a plurality of the weights are configured according to a random normal distribution or all of the weights are configured to be zero; the time constant is initialized to a reasonable default value or a random value within a reasonable range; the threshold is initialized to a reasonable default value or a random value within a reasonable range. Other parameters which are not exhaustively listed can be randomly initialized or set to constants by any reasonable method, or any other obvious conventional way.

step 110: initializing attacked NN configuration parameters $\Theta^*$.

The initializing technique performs initialization by adding noise to the configuration parameters $\Theta$. In a specific embodiment, $\Theta^* \leftarrow \Theta + |\Theta| \cdot \epsilon_{relative} \cdot R_1 + \epsilon_{const} \cdot R_2$; $R_1, R_2 \sim N(0,1)$, where |•| represents an element-wise absolute value, $\epsilon_{relative}$ and $\epsilon_{const}$ are two constants, and $R_1$ and $R_2$ are normally distributed random variables following N(0,1). Unless otherwise emphasized, "•" in the present invention refers to element-wise multiplication.

The specific embodiment includes one constant $\epsilon_{const}$ and a term $|\Theta| \cdot \epsilon_{relative}$ related to magnitude of each configuration parameter, wherein $\epsilon_{relative}$ determines a fraction of the magnitude that is used for a perturbation. The constants do not have to be global in the sense that different values may be chosen for distinct parameter groups such as time constants and thresholds. $R_1$, $R_2$ can follow other alternative random distribution ways, such as a random distribution with a center of 0.

step 120: calculating a step size $\alpha$ for each parameter in the configuration parameters $\Theta^*$.

In a specific embodiment, for example, in $l^\infty$ space, the step size $$\alpha = \frac{1}{N_{steps}} \cdot (|\Theta| \cdot \zeta_{relative} + \zeta_{const}),$$

where $N_{steps}$ represents a number of attacking times, where $\zeta_{relative}$ and $\zeta_{const}$ represent two constants. The $l^\infty$ norm is used here. This way, the attacked configuration parameters end up either within or on an ellipsoid.

step 130: (a) calculating a gradient $\nabla_{\Theta^*} \mathcal{L}_{robust}(f(\Theta,X), f(\Theta^*, X))$ of a robustness loss function with respect to the attacked configuration parameters $\Theta^*$, wherein $\nabla$ is a gradient operator (or a nabla-operator). Step 130(a) is denoted as $g \leftarrow \nabla_{\Theta^*} \mathcal{L}_{robust}(f(\Theta,X), f(\Theta^*, X))$, where $f$ is an NN, and X is an input in a dataset.

(b) calculating an update vector v: within unit norm in $l^p$ space (Lebesgue space), calculating and obtaining a vector v that maximizes $v^T g$ as the update vector, where T is transpose, and there is a dot product operation between $v^T$ and g. Step 130 (b) is described in mathematical language as $$v \leftarrow \arg\max_{v: \|v\|_p \leq 1} v^T g.$$

A solution to the above formula is $$v^* = \frac{\text{sign}(g) \odot |g|^{p^*-1}}{\|g\|_{p^*}^{p^*-1}},$$

where p* is the Holder conjugate of p $$\left(\text{e.g., } \frac{1}{p} + \frac{1}{p^*} = 1\right).$$

Preferably, p=2 (second best) or $\infty$ (best). In $l^2$ space, a solution of the above optimization problem is $$\frac{g}{\|g\|_2}.$$

In $l^\infty$ space, a solution of the above optimization problem is sign(g). In the present application, sign(•) is a sign function.

The above v is the vector that has at most unit length in $l^p$ space and is aligned best with the gradient vector g.

For convenience of understanding, in the field of NN accelerators, an NN can generally be defined as a function $f: \mathbb{R}^p \times \mathbb{R}^k \rightarrow \mathbb{R}^d$, which means that according to network configuration parameters $\Theta \in \mathbb{R}^p$, when certain inputs $X \in \mathbb{R}^k$ are given, outputs $\hat{y} \in \mathbb{R}^d$ are obtained.

In the field of machine learning, loss functions are usually involved. Generally, a loss function can be defined as $\mathcal{L}(\Theta, \Phi, \hat{Y}) \rightarrow \mathbb{R}^1$, where $\Theta$ is network configuration parameters, $\Phi$ is a test dataset, $\hat{Y}$ is target output values, and $\mathbb{R}^1$ is a real value.

In the present invention, the loss function is defined as $\mathcal{L}(\Theta, X, y) = \mathcal{L}_{normal}(\Theta, X, y) + \beta_{rob} \cdot \mathcal{L}_{robust}(\Theta, \mathcal{A}(\Theta), X, y)$, where $\Theta$ is network configuration parameters; X is an input in a dataset; y is a target output in a dataset, $\mathcal{L}_{normal}(\Theta, X, y)$ is a loss function generally defined as above and is called a target/normal loss function in the present invention; $\mathcal{A}(\Theta)$ represents attacked configuration parameters which are the network configuration parameters $\Theta$ that are attacked, and is denoted as $\Theta^* = \mathcal{A}(\Theta)$, $\mathcal{A}: \mathbb{R}^p \times (\mathbb{R}^p \times \mathbb{R}^k \to \mathbb{R}^d) \times \mathbb{R}^k \times \{\mathbb{R}\}^4 \to \mathbb{R}^p$; $\mathcal{L}_{robust}(\Theta, \mathcal{A}(\Theta), X, y)$ represents a robustness loss function after the configuration parameters $\Theta$ are attacked and become $\mathcal{A}(\Theta)$; $\beta_{rob}$ is a weighting factor controlling influence of a robustness loss on an optimization process, can be, for example, 0.1 or 0.25, and represents a trade-off between task performance and robustness. In the present invention, the loss function $\mathcal{L}(\Theta, X, y)$ is also called a total loss function denoted as $\mathcal{L}_{total}(\Theta, X, y)$. The above functions are sometimes abbreviated as $\mathcal{L}_{total}$, $\mathcal{L}_{normal}$, $\mathcal{L}_{robust}$.

The target loss function can be exemplarily defined as $$\mathcal{L}_{normal}(\Theta, X, y) = \frac{1}{B}\sum_{i=1}^{B} l(f(\Theta, X_i), y_i),$$

where B is batch size, and has a value which is a number of a single sample (B=1), or a number of a whole dataset (B=$N_{data}$); $l(\bullet): \mathbb{R}^d \times \mathbb{R}^d \to \mathbb{R}$ is a standard loss function which can have different definitions such as a mean square error function, and a categorical cross entropy function; and i is a count. In the related art, the target loss function has various definitions, and different definitions can be selected here on a basis of different purposes. This is not particularly limited in the present invention.

The robustness loss function is used to characterize a change of a network output after $\Theta^* = \mathcal{A}(\Theta)$, and can also be defined in different ways. The specific form thereof is not limited in the present invention. As an example, it can be defined as follows:

$$\mathcal{L}_{robust}(\Theta, \mathcal{A}(\Theta), X, y) = \frac{1}{B}\sum_{i=1}^{B} l_{rob}(f(\Theta, X_i), f(\Theta^*, X_i)),$$

where B represents the batch size, i is the count, and $l_{rob}(\bullet): \mathbb{R}^d \times \mathbb{R}^d \to \mathbb{R}$ represents distance between outputs $f(\Theta, X_i)$ and $f(\Theta^*, X_i)$. That is, the change of the network output under a certain attack can be defined in many ways, and includes, but is not limited to:

1. mean square error $l_{mse} = \frac{1}{d}\sum_{i=1}^{d}(f(\Theta, x)_i - f(\Theta^*, x)_i)^2$;

2. forward Kullback–Leibler divergence $l_{kl-f} =$ $$\sum_{i=1}^{d} f(\Theta, x)_i \cdot \log\left(\frac{f(\Theta, x)_i}{f(\Theta^*, x)_i}\right);$$

3. reverse Kullback–Leibler divergence $l_{kl-r} =$ $$\sum_{i=1}^{d} f(\Theta^*, x)_i \cdot \log\left(\frac{f(\Theta^*, x)_i}{f(\Theta, x)_i}\right);$$

where d is size of the output y, and i is the count.

In addition, $l_{rob}$ can also be defined on a basis of an attack on the network configuration parameters to be a metric of NN performance based on a task, such as degradation of the task performance under attacked configuration parameters $\Theta^*$. Those skilled in the art may have different specific definitions for it according to the above meanings, and the specific definition thereof is not limited in the present invention.

$\mathcal{L}_{robust}(\Theta, \mathcal{A}(\Theta), X, y)$ can also be denoted as $\mathcal{L}_{robust}(\Theta, \Theta^*, X, y)$. Sometimes X, y can be omitted for convenience, and $\mathcal{L}_{robust}(\Theta, \Theta^*, X, y)$ can be denoted as $\mathcal{L}_{robust}(\Theta, \Theta^*)$ or $\mathcal{L}_{robust}(\Theta^*)$. Or $\mathcal{L}_{robust}(\Theta, \Theta^*, X, y)$ can be denoted as $\mathcal{L}_{robust}(f(\Theta, X), f(\Theta^*, X))$ to express distance between network output results in a highlighted manner.

According to the specific method proposed in the present invention, an algorithm generates the configuration parameters $\Theta^*$ during simulation of an adversary.

step 140: after multiplying the update vector v by the step size $\alpha$, adding $\alpha \cdot v$ to the current attacked configuration parameters $\Theta^*$; and in $l^p$ space, projecting a result of the addition onto an ellipsoid centered at $\Theta$ and having a quantization matrix $W = (\text{diag}(|\Theta|) \cdot \zeta_{relative} + I \cdot \zeta_{const})$, and using a result of the projection to update the configuration parameters $\Theta^*$, where $\zeta_{relative}$ and $\zeta_{const}$ represent two constants, I is an identity matrix, diag($\bullet$) is a diagonal matrix, and |$\bullet$| represents an element-wise absolute value.

Step 140 is described in mathematical language as $$\Theta^* \leftarrow \prod\nolimits_{Ellipsoid(\Theta, W, p)}(\Theta^* + \alpha \cdot v),$$

where $W = (\text{diag}(|\Theta|) \cdot \zeta_{relative} + I \cdot \zeta_{const})$, $\zeta_{relative}$ and $\zeta_{const}$ represent two constants, I is an identity matrix, and diag($\bullet$) is a diagonal matrix.

Ellipsoid(c, W, p) denotes the ellipsoid in $l^p$ space centered at c and having the quantization matrix W. The ellipsoid is obtained by multiplying every vector in the $l^p$ ball centered at c by the matrix W. In the above projection, the ellipsoid is centered at $\Theta$. $\Pi_{\epsilon, l^p}$ denotes a projection operator on an $\zeta$-ellipsoid in $l^p$ space. $\Pi_{\epsilon, l^p}(m)$ means projecting m onto the $\zeta$-ellipsoid in lp space. When in $l^\infty$ space, this is equivalent to min(max(m, $\Theta - \epsilon$), $\Theta + \epsilon$) element wise, where $\epsilon$ is a vector; if one starts from a center of the ellipsoid, it is not required to perform a projection. In $l^2$ space, this is equivalent to solving the following optimization problem:

$$x^* = \arg\min_{x} \frac{1}{2} \|m - x\|_2^2$$

constrained by $(x-c)^T W^{-2}(x-c) \leq 1$, where $W = (\text{diag}(|\Theta|) \cdot \zeta_{relative} + I \cdot \zeta_{const})$, $c = \Theta$, $m = \Theta^* + \alpha \cdot v$. A solution to the problem is a vector nearest to $\Theta^* + a \cdot v$ that is still within or on the ellipsoid.

In above step, to update the configuration $\Theta^*$, a product of v and the step size $\alpha$ is used. To ensure that a resulting vector is still within or on the ellipsoid, we apply a projection. Because the update is based on the gradient, and the gradient captures a direction of steepest ascent of a function, this causes the configuration parameters to move in a direction of maximal divergence from the original output of the network and the configuration parameters $\Theta$. The adversary designed by the algorithm aims to search for a perturbation that breaks the network the most.

In an alternative embodiment, above step 13(b) can be omitted, which means that in step 14, g is directly used instead of v. That is, after multiplying g by a step size α, adding α·g to the current attacked configuration parameters Θ*; and in $l^p$ space, projecting a result of the addition onto an ellipsoid centered at Θ and having a quantization matrix W=(diag(|Θ|)·$\zeta_{relative}$+I·$\zeta_{const}$), and using a result of the projection to update the configuration parameters Θ*, where $\zeta_{relative}$ and $\zeta_{const}$ represent two constants, I is an identity matrix, and diag(•) is a diagonal matrix.

step 150: looping through step 130 and step 140 sequentially $N_{steps}$ times. If looping is completed, jumping out of the loop and perform a subsequent step.

$N_{steps}$ can be a fixed value not less than 1. A condition under which jumping out of the loop is performed may also be based on whether measured adversarial performance meets a predetermined condition. For example, the condition under which jumping out of the loop is performed may ensure a value of the robustness loss function reaches a predetermined value. This is not limited in the present invention.

The configuration parameter Θ* after the update is the best attack strategy that is for the network and is returned by the adversary (and can sacrifice the network performance to the greatest extent). The present invention simulates device mismatch during the attack.

In some embodiments, the attack that is of an attacker and is on the configuration parameters may be on a part of all of the configuration parameters. For example, the part may be time constants (of synapses and neurons), thresholds, etc. This is not limited in the present invention.

Because in step 120, the step size α is equal to $$\frac{\sim |\Theta|}{N_{steps}},$$

each or the dimensions of the bounding box in step 702 in FIG. 7 has the linear increasing relationship with the magnitude of the corresponding configuration parameter of the configuration parameters that the simulated attack starts from. The example in FIG. 8 is an example in the $l^\infty$ space. Referring to FIG. 8, for any step of the $N_{steps}$, an attacked configuration parameter $\theta_1$* (i.e., a first component) of the attacked configuration parameters θ* is either increased or decreased by $$\frac{\sim |\theta_{810\_1}|}{N_{steps}}$$

depending on a sign $v_1$ of the update vector v. Thus, after $N_{steps}$ iterative steps, the maximal magnitude $t_{810\_1}$ that is of the perturbation and can be added to or subtracted from the configuration parameter $\theta_{810\_1}$ is equal to $\sim|\theta_{810}|$.

In step 140, the projection projects, onto the ζ-ellipsoid, the attacked configuration parameters which are increased or decreased, wherein the ζ-ellipsoid is quantized by the matrix W so that the configuration parameters which are increased or decreased do not get too far from the configuration parameters that the simulated attack starts from. Because the matrix W contains the diagonal matrix diag(|Θ|), the increasing relationship between each of the dimensions of the bounding box and the magnitude of the corresponding configuration parameter of the configuration parameters that the simulated attack starts from mentioned above is kept.

step 160: calculating a robustness loss function $\mathcal{L}_{robust}$(Θ, $\mathcal{A}$(Θ), X, y). The loss depends at least on the attacked configuration parameter Θ*= $\mathcal{A}$(Θ).

step 170: calculating a target loss function $\mathcal{L}_{normal}$(Θ, X, y). The loss depends only on the configuration parameters Θ that are not attacked.

step 180: combining the target loss function $\mathcal{L}_{normal}$(Θ, X, y) and the robustness loss function $\mathcal{L}_{robust}$(Θ, $\mathcal{A}$(Θ), X, y) into a total loss function $\mathcal{L}$(Θ, X, y), i.e., $\mathcal{L}_{total}$(Θ, X, y). A way of combining can be addition. Preferably, $\mathcal{L}$(Θ, X, y)=$\mathcal{L}_{normal}$(Θ, X, y)+$\beta_{rob}$·$\mathcal{L}_{robust}$(Θ, $\mathcal{A}$(Θ), X, y), where $\beta_{rob}$ is the weighting factor controlling influence of the robustness loss on the optimization process.

step 190: calculating a gradient of the total loss function $\mathcal{L}$(Θ, X, y) with respect to Θ. The gradient can be denoted as $\nabla_\Theta \mathcal{L}_{total}$.

Methods for calculating the gradient $\nabla_\Theta \mathcal{L}_{total}$ include, but are not limited to, numerical calculation by repeated sampling of Θ, analytical calculation by an automatic differentiation/difference method or by theoretically deriving formula for the gradients, or any other way known to those skilled in the art.

step 200: using an optimization method to modify the configuration Θ on a basis of $\nabla_\Theta \mathcal{L}_{total}$.

The optimization method may be any of various current standard optimization methods, or any other reasonable optimization method, including, but not limited to, a statistical gradient descent method and gradient descent with momentum. The optimization method may also be a new optimization method. A specific form of the above optimization method is not limited in the present invention.

step 210: looping through step 110 to step 200 $N_{opt}$ times. $N_{opt}$ can be a fixed value. After looping $N_{opt}$ times, jumping out of the loop is performed.

$N_{opt}$ can also be determined on a basis of NN performance measured by any of several current techniques (for example, test accuracy, validation accuracy, convergence of the loss function, or others). That is, the above loop can be terminated after the network performance reaches a target.

step 220: returning the NN configuration parameters Θ which are final.

Above steps 130 to 150 form an inner attacking loop, and steps 110 to 210 form an outer optimization loop.

FIG. 10 includes steps 100 to 220. Step 902 in FIG. 9 corresponds to step 100. Step 904 in FIG. 9 includes steps 110 to 150. Steps 908, 906, and 910 in FIG. 9 correspond to steps 160, 170, and 180, respectively. Step 912 in FIG. 9 corresponds to steps 190 and 200. Step 914 in FIG. 9 corresponds to step 210. Step 916 in FIG. 9 corresponds to step 220.

In some alternative embodiments, for the above method, the configuration parameters Θ may also be optimized by a gradient-free method. This can be specifically as follows:

A. randomly initializing Θ;

B: obtaining Θ* by sampling around Θ; and calculating $\mathcal{L}_{robust}$(Θ, Θ*, X, y). This can be achieved by randomly sampling within and/or on a surface of an ellipsoid surrounding Θ, or by sampling at a fixed length around Θ; and then taking a worst value or an average value as $\mathcal{L}_{robust}$(Θ, Θ*, X, y);

C: combining $\mathcal{L}_{normal}$(Θ, X, y) and $\mathcal{L}_{robust}$(Θ, Θ*, X, y) and obtaining $\mathcal{L}$(Θ, X, y). For the way of combining, reference may be made to the foregoing embodiments.

D: searching for the configuration parameters Θ that minimize $\mathcal{L}$(Θ, X, y). This can be accomplished using a random search, an evolutionary algorithm, a Gaussian process, a Bayesian optimization approach, or any other reasonable minimization search method.

Generally, continuing to refer to FIG. 10, the present invention proposes an NN configuration parameter training method, wherein the training method is configured in a training apparatus, and the training apparatus performs the training method to obtain network configuration parameters that can be deployed on an NN accelerator. The training method includes following steps:

step of an inner attacking loop including:
maximizing, by searching for NN configuration parameters Θ* near current NN configuration parameters Θ, a difference in an NN output result between the NN configuration parameters Θ and Θ*;
after a first predetermined condition is met, from a perspective of attacking the NN configuration parameters, obtaining the attacked NN configuration parameters Θ*, and jumping out of step of the inner attacking loop;
step of an outer optimization loop including:
taking a difference $\mathcal{L}_{robust}$ in the NN output result between the current NN configuration parameters Θ and the attacked NN configuration parameters Θ* as a part of a total loss function $\mathcal{L}_{total}$, and obtaining a gradient $\nabla_\Theta \mathcal{L}_{total}$ of the total loss function with respect to the current NN configuration parameters Θ;
using an optimization method based on the gradient $\nabla_\Theta \mathcal{L}_{total}$ to search for and update the current NN configuration parameters Θ so that a value of the total loss function $\mathcal{L}_{total}$ is minimized;
when a second predetermined condition is not met, entering step of the inner attacking loop again;
after the second predetermined condition is met, jumping out of step of the outer optimization loop and taking the current NN configuration parameters Θ updated last as target NN configuration parameters which are final.

In some embodiments, the first predetermined condition is that a number of times of executing the inner attacking loop reaches a predetermined number of times or a predetermined condition is met on a basis of measured adversarial performance.

In some embodiments, the second predetermined condition is that a number of times of executing the outer optimization loop reaches a predetermined number of times or NN performance corresponding to the current NN configuration parameters Θ reaches a predetermined target.

In some embodiments, before entering step of the inner attacking loop, initializing all of the NN configuration parameters Θ*.

In some embodiments, in a process of searching for the NN configuration parameters Θ*, the NN configuration parameters Θ* that are updated each time are located within or on a surface of an ellipsoid centered at the current NN configuration parameters Θ.

In some embodiments, in the process of searching for the NN configuration parameters Θ*, the gradient $\nabla_{\Theta^*} \mathcal{L}_{robust}$ which is steepest is used to update the network configuration parameters Θ*, so that the NN configuration parameters Θ* move in a direction of maximal divergence from the NN output result corresponding to the NN configuration parameters Θ.

In some embodiments, step of taking the difference $\mathcal{L}_{robust}$ in the NN output result between the current NN configuration parameters Θ and the attacked NN configuration parameters Θ* as the part of the total loss function $\mathcal{L}_{total}$ specifically is:

$\mathcal{L}_{total} = \mathcal{L}_{normal} + \beta_{rob} \cdot \mathcal{L}_{robust}$, where $\beta_{rob}$ is a weighting factor controlling influence of the robustness loss on an optimization process.

The present invention also discloses an NN configuration parameter training method, which is performed by a training apparatus. The method includes following steps:

searching for NN configuration parameters Θ* on a basis of NN configuration parameters Θ, so that the NN configuration parameters Θ* move in a direction of maximal divergence from an NN output result corresponding to the NN configuration parameters Θ;
taking a difference $\mathcal{L}_{robust}$ in an NN output result between the current NN configuration parameters Θ and the attacked NN configuration parameters Θ* as a part of a total loss function $\mathcal{L}_{total}$;
optimizing the NN configuration parameters Θ on a basis of the total loss function $\mathcal{L}_{total}$.

In some embodiments, in a process of searching for the NN configuration parameters Θ*, the NN configuration parameters Θ* that are updated each time are located within or on a surface of an ellipsoid centered at the current NN configuration parameters Θ.

Figure 11:
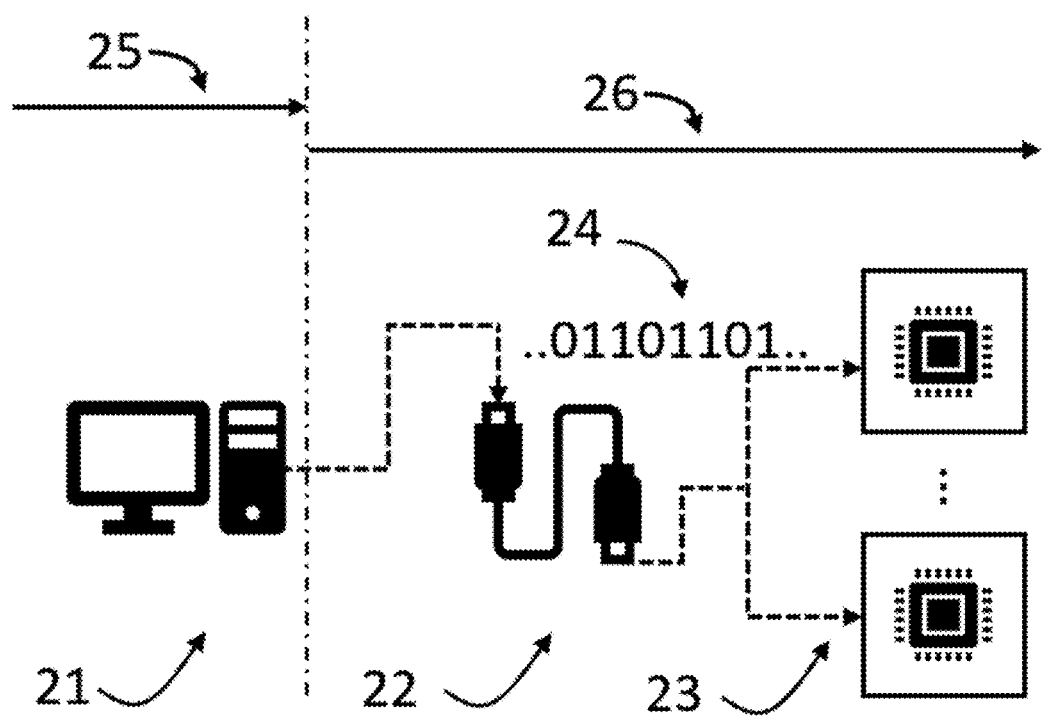
FIG. 11 is a schematic diagram of NN configuration parameters from being generated to being deployed on a chip.

FIG. 11 is a schematic diagram of configuration parameters from being generated to being deployed on a chip. A training apparatus 21 may be an ordinary computer, a server, a training apparatus dedicated to machine learning (such as a computing apparatus including a high-performance graphics processing unit (GPU)), or a high-performance computer. The training apparatus 21 includes a memory and at least one processor coupled to the memory, wherein the at least one processor is configured to perform any one of the aforementioned NN configuration parameter training methods. Specifically, training algorithms written in various programming languages (such as Python) can be used according to the aforementioned methods. The training algorithms may be in a form of source code, and/or may also be in a form including machine code. After being compiled, the machine code can be directly run on a machine. Any one of representations of these training algorithms can be stored in a storage medium (a random-access memory (RAM), a read-only memory (ROM), a magnetic disk, a solid-state hard disk, or another carrier) in a form of data (in a representation form of a magnitude of a read level, resistance, capacitance, or another electrical parameter), and may be a part of the training apparatus.

The training apparatus 21 can obtain various datasets dedicated to training from, for example, local storage and network downloads, and use the datasets as inputs of the training algorithms to obtain NN configuration parameters. The training apparatus 21 can be used to perform the routine 300 in FIG. 3, the routine 300 modified by step 702 in FIG. 7, the method 900 in FIG. 9, and the method in FIG. 10. This stage is a training stage 25 during which the configuration parameters are generated.

A next stage is a deployment stage 26 of the configuration parameters. With the help of dedicated deployment software, during the deployment stage, the configuration data 24 that is generated during the training stage (and may be stored directly in the training apparatus or in a dedicated deployment apparatus not shown) is transmitted through a channel 22 (such as a cable or any one of various types of networks.) to storage units (such as storage units that simulate synapses) of NN accelerators 23 (such as artificial intelligence chips, sub-threshold neuromorphic chips). In this way, a configuration parameter deployment process of the NN accelerators can be completed. In other words, any one of the aforementioned training methods is configured in the training apparatus, and the training apparatus performs any one of the training methods to obtain network configuration parameters that can be deployed on an NN accelerator (such as a neuromorphic chip).

Figure 12:
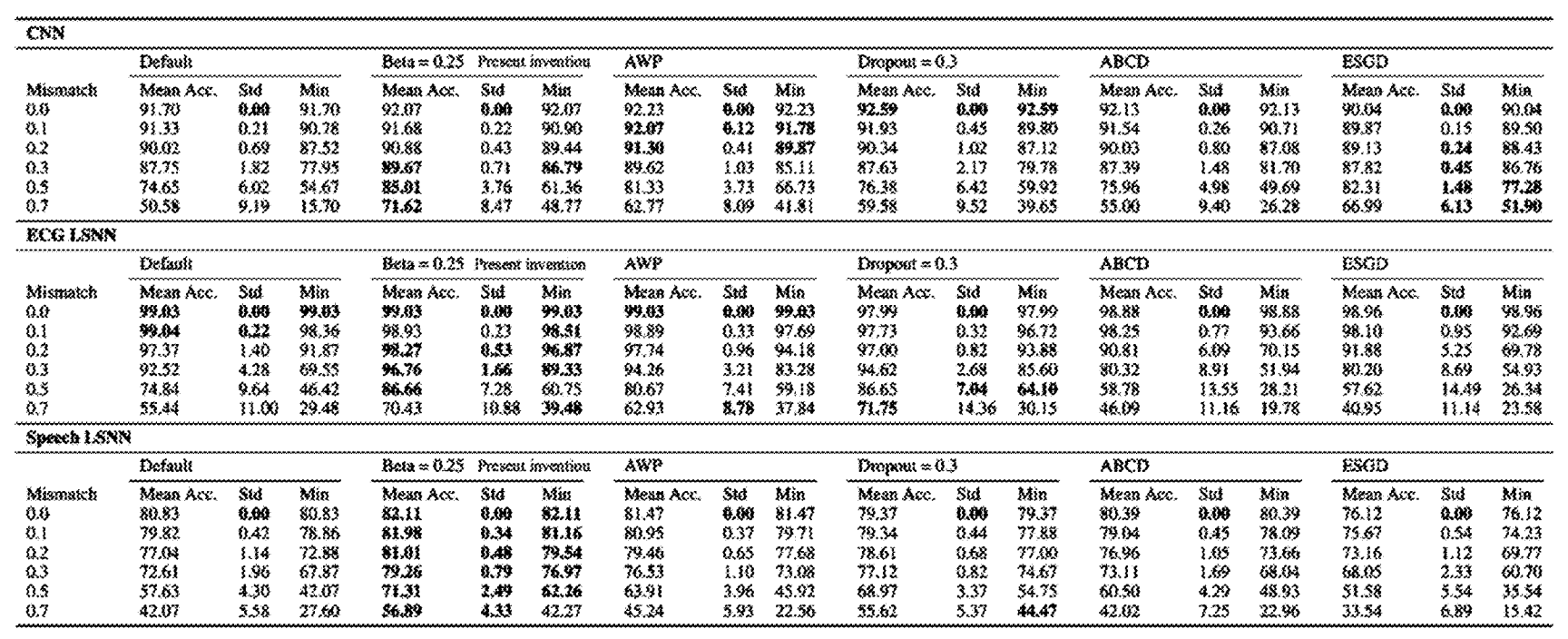

FIG. 12 is a performance comparison diagram of the present invention and other algorithms. It can be seen from the diagram that performance of the AWP algorithm closest to the present application is higher than other algorithms (Dropout, ABCD, ESGD), especially for a convolutional NN form. The present invention is superior to the AWP algorithm in all three network forms, and has obvious advantages especially under the condition of each mismatch strength interval in a long short-term memory spiking NN (SNN) form. In the convolutional NN, the advantages of the present invention are more prominent under the condition of high strength mismatch.

Any reasonable combination of all of the above technical features serves as the disclosure of a certain technical solution. The above are the specific embodiments for illustrating some embodiments of the present invention. Those skilled in the art may perform operations such as replacement, modification, order adjustment, and join of the above specific embodiments to obtain a same or an approximately same technical effect. The present invention and the protection content of the claims are not limited only to the content of the aforementioned specific embodiments. Based on this, the content generalized in the claims is intended to achieve, through generalization, a broader technical solution scope as much as possible on a basis of the specific implementations. The best protection scope of the claims should be the broadest reasonable interpretation by those skilled in the art.

What is claimed is:

1. A neural network (NN) configuration parameter training method, wherein the training method is configured in a training apparatus, and the training apparatus performs the training method to obtain NN configuration parameters that can be deployed on an NN accelerator, wherein the training method comprises following steps:
a step of an inner attacking loop comprising:
maximizing, by searching for attacked NN configuration parameters $\Theta^*$ near current NN configuration parameters $\Theta$, a difference in an NN output result between the current NN configuration parameters $\Theta$ and the attacked NN configuration parameters $\Theta^*$;
after a first predetermined condition is met, from a perspective of attacking the NN configuration parameters, obtaining the attacked NN configuration parameters $\Theta^*$, and jumping out of the step of the inner attacking loop;
a step of an outer optimization loop comprising:
taking a difference $\mathcal{L}_{robust}$ in the NN output result between the current NN configuration parameters $\Theta$ and the attacked NN configuration parameters $\Theta^*$ as a part of a total loss function $\mathcal{L}_{total}$, and obtaining a gradient of the total loss function with respect to the current NN configuration parameters $\Theta$ according to $\nabla_\Theta \mathcal{L}_{total}$;
using an optimization method based on the gradient $\nabla_\Theta \mathcal{L}_{total}$ to search for and update the current NN configuration parameters Q so that a value of the total loss function $\mathcal{L}_{total}$ is minimized;
when a second predetermined condition is not met, entering the step of the inner attacking loop again;
after the second predetermined condition is met, jumping out of the step of the outer optimization loop and taking the current NN configuration parameters $\Theta$ updated last as target NN configuration parameters which are final.

2. The NN configuration parameter training method of claim 1, wherein:
the first predetermined condition is that a number of times of executing the inner attacking loop reaches a predetermined number of times or a predetermined condition is met on a basis of measured adversarial performance;
the second predetermined condition is that a number of times of executing the outer optimization loop reaches a predetermined number of times or NN performance corresponding to the current NN configuration parameters $\Theta$ reaches a predetermined target.

3. The NN configuration parameter training method of claim 1, wherein:
in a process of searching for the attacked NN configuration parameters $\Theta^*$, the attacked NN configuration parameters $\Theta^*$ that are updated each time are located within or on a surface of an ellipsoid centered at the current NN configuration parameters $\Theta$.

4. The NN configuration parameter training method of claim 1, wherein:
a process of searching for the attacked NN configuration parameters $\Theta^*$ comprises using the gradient $\nabla_{\Theta^*} \mathcal{L}_{robust}$ which is steepest to update the attacked NN configuration parameters $\Theta^*$, so that the attacked NN configuration parameters $\Theta^*$ move in a direction of maximal divergence from the NN output result corresponding to the NN configuration parameters $\Theta$.

5. The NN configuration parameter training method of claim 1, wherein:
the step of taking the difference $\mathcal{L}_{robust}$ in the NN output result between the current NN configuration parameters $\Theta$ and the attacked NN configuration parameters $\Theta^*$ as the part of the total loss function $\mathcal{L}_{total}$ specifically is: $\mathcal{L}_{total} = \mathcal{L}_{normal} + \beta_{rob} \cdot \mathcal{L}_{robust}$, where $\mathcal{L}_{normal}$ a target loss function, and $\beta_{rob}$ is a weighting factor controlling influence of the robustness loss on an optimization process.

6. The NN configuration parameter training method of claim 1, wherein:
the first predetermined condition is that a number of times of executing the inner attacking loop reaches a predetermined number of times or a predetermined condition is met on a basis of measured adversarial performance;
the second predetermined condition is that a number of times of executing the outer optimization loop reaches a predetermined number of times or NN performance corresponding to the current NN configuration parameters $\Theta$ reaches a predetermined target;
before entering the step of the inner attacking loop, initializing all of the attacked NN configuration parameters $\Theta^*$;
in a process of searching for the attacked NN configuration parameters $\Theta^*$, the attacked NN configuration parameters $\Theta^*$ that are updated each time are located within or on a surface of an ellipsoid centered at the current NN configuration parameters $\Theta$;
the process of searching for the attacked NN configuration parameters $\Theta^*$ comprises using the gradient $\nabla_{\Theta^*} \mathcal{L}_{robust}$ which is steepest to update the attacked NN configuration parameters $\Theta^*$, so that the NN configuration parameters $\Theta^*$ moves in a direction of maximal divergence from the NN output result corresponding to the NN configuration parameters $\Theta$;

the step of taking the difference $\mathcal{L}_{robust}$ in the NN output result between the current NN configuration parameters Θ and the attacked NN configuration parameters Θ* as the part of the total loss function $\mathcal{L}_{total}$ specifically is: $\mathcal{L}_{total}=\mathcal{L}_{normal}+\beta_{rob}\mathcal{L}_{robust}$, where $\mathcal{L}_{normal}(\Theta, X, y)$ is a target loss function, and $\beta_{rob}$ is a weighting factor controlling influence of the robustness loss on an optimization process.

7. The NN configuration parameter training method of claim 1, wherein the training method comprises following steps:

(100) initializing the NN configuration parameters Θ;

(110) initializing attacked NN configuration parameters Θ*;

(120) calculating a step size α for each parameter in the attacked NN configuration parameters Θ*;

(130):
(a) calculating a gradient of a robustness loss function with respect to the attacked NN configuration parameters Θ* according to $g \leftarrow \nabla_{\Theta*}\mathcal{L}_{robust}(f(\Theta, X), f(\Theta^*, X))$, where $\nabla$ is a gradient operator, $\mathcal{L}_{robust}(f(\Theta,X), f(\Theta^*, X))$ is the robustness loss function that represents an NN output change, $f$ is an NN, and X is an input in a dataset;
(b) calculating an update vector v comprising within unit norm in $l^p$ space, calculating and obtaining a vector v that maximizes $v^T g$ as the update vector according to $$v \leftarrow \arg\max_{v: \|v\|_p \le 1} v^T g,$$

where T is transpose, and there is a dot product operation to between $v^T$ and g;

(140) after multiplying the update vector v by the step size α, adding α·v to the current attacked NN configuration parameters Θ*; and in $l^p$ space, projecting a result of the addition onto an ellipsoid centered at the NN configuration parameters Θ and having a quantization matrix W calculated according to $W=(\text{diag}(|\Theta|)\cdot\zeta_{relative}+I\cdot\zeta_{const})$, and using a result of the projection to update the attacked NN configuration parameters Θ*; and the step (140) being according to $\Theta^* + \Pi_{Ellipsoid(\Theta, W, p)}(\Theta^* + \alpha \cdot v)$, where $\zeta_{relative}$ and $\zeta_{const}$ represent two constants, I is an identity matrix, diag(•) is a diagonal matrix, and |•| represents an element-wise absolute value;

(150) looping through the step (130) and the step (140) sequentially $N_{steps}$ times;

(160) calculating a robustness loss function $\mathcal{L}_{robust}(\Theta, \Theta^*, X, y)$, where y is a target output in a dataset;

(170) calculating a target loss function $\mathcal{L}_{normal}(\Theta, X, y)$, where y is the target output in the dataset;

(180) combining the target loss function $\mathcal{L}_{normal}(\Theta, X, y)$ and the robustness loss function $\mathcal{L}_{robust}(\Theta, \Theta^*, X, y)$ into a total loss function $\mathcal{L}_{total}(\Theta, X, y)$;

(190) calculating a gradient of the total loss function with respect to the NN configuration parameters Θ according to $\nabla_\Theta \mathcal{L}_{total}$;

(200) using an optimization method to modify the NN configuration parameters Θ on a basis of $\nabla_\Theta \mathcal{L}_{total}$;

(210) looping through the step (110) to the step (200) $N_{opt}$ times;

(220) returning the NN configuration parameters Θ which are final;

wherein steps 130 to 150 form an inner attacking loop, and steps 110 to 210 form an outer optimization loop.

8. The NN configuration parameter training method of claim 7, wherein:
the step (120) comprises in $l^\infty$ space where p=∞, calculating the step size α according to $$\alpha = \frac{1}{N_{steps}} \cdot (|\Theta| \cdot \zeta_{relative} + \zeta_{const}).$$

9. The NN configuration parameter training method of claim 7, wherein:
the step (b) in the step (130) is omitted, and the step (140) comprises directly multiplying g by the step size α, and/or
in the step (130) and the step (140), p=2 or ∞, and/or
in the step (150), a replacing loop termination condition is that a predetermined condition is met on a basis of measured adversarial performance.

10. The NN configuration parameter training method of claim 7, wherein:
in the step (130) and the step (140), p=2 or ∞; and
in the step (180), $\mathcal{L}_{total}(\Theta, X, y)=\mathcal{L}_{normal}(\Theta, X, y)+\beta_{rob} \cdot \mathcal{L}_{robust}(\Theta, \Theta^*, X, y)$, where $\beta_{rob}$ is a weighting factor controlling influence of the robustness loss on an optimization process.

11. The NN configuration parameter training method of claim 10, wherein:
the step (110) comprises initializing the attacked NN configuration parameters Θ* by adding noise to the NN configuration parameters Θ according to $\Theta^* \leftarrow \Theta + |\Theta| \cdot \epsilon_{relative} \cdot R_1 + \epsilon_{const} \cdot R_2$; $R_1$, $R_2 \sim N(0,1)$, where |•| represents an element-wise absolute value, $\epsilon_{relative}$ and $\epsilon_{const}$ are two constants, and $R_1$ and $R_2$ are normally distributed random variables following $N(0,1)$.

12. The NN configuration parameter training method of claim 11, wherein:
the step (b) in the step (130) is omitted, and the step (140) comprises directly multiplying g by the step size α; and/or
in the step (150), a replacing loop termination condition is that a predetermined condition is met on a basis of measured adversarial performance; and/or
in the step (210), a replacing loop termination condition is that NN performance reaches a predetermined target.

13. The NN configuration parameter training method of claim 7, wherein:
calculating a robustness loss function $\mathcal{L}_{robust}(\Theta, \Theta^*, X, y)$ specifically comprises: obtaining Θ* by sampling randomly within and/or on a surface of an ellipsoid surrounding the NN configuration parameters Θ, or by sampling at a fixed length around the NN configuration parameters Θ; and then taking a worst value or an average value as $\mathcal{L}_{robust}(\Theta, \Theta^*, X, y)$, where X is an input in a dataset, and y is a target output in a dataset.

14. The NN configuration parameter training method of claim 7, wherein:
the step (170) comprises calculating the target loss function $\mathcal{L}_{normal}(\Theta, X, y)$ according to $$\mathcal{L}_{normal}(\Theta, X, y) = \frac{1}{B}\sum_{i=1}^{B} l(f(\Theta, X_i), y_i)$$

where B is batch size, i is a count, and l(•) is a standard loss function.

15. The NN configuration parameter training method of claim 7, wherein:
the NN configuration parameters comprise one or more of the following: a weight, a time constant, or a threshold.

16. The NN configuration parameter training method of claim 15, wherein:
the step (100) comprises: configuring a plurality of the weights according to a random normal distribution or configuring all of the weights to be zero; and/or
initializing the time constant to a reasonable default value or a random value within a reasonable range; and/or
initializing the threshold to a reasonable default value or a random value within a reasonable range.

17. The NN configuration parameter training method of claim 7, wherein:
the step (110) comprises initializing the attacked NN configuration parameters $\Theta^*$ by adding noise to the NN configuration parameters $\Theta$ according to $\Theta^* \leftarrow \Theta + |\Theta| \cdot \epsilon_{relative} \cdot R_1 + \epsilon_{const} \cdot R_2$; $R_1, R_2 \sim N(0,1)$, where $|\cdot|$ represents an element-wise absolute value, $\epsilon_{relative}$ and $\epsilon_{const}$ are two constants, and $R_1$ and $R_2$ are normally distributed random variables following $N(0,1)$.

18. The NN configuration parameter training method of claim 7, wherein:
in the step (200), the optimization method is stochastic gradient descent or gradient descent with momentum.

19. A storage apparatus, wherein: the storage apparatus is configured to store source code written for a neural network (NN) configuration parameter training method using a programming language and/or machine code that can be run directly on a machine, wherein the NN configuration parameter training method comprises following steps:
a step of an inner attacking loop comprising:
maximizing, by searching for attacked NN configuration parameters $\Theta^*$ near current NN configuration parameters $\Theta$, a difference in an NN output result between the current NN configuration parameters $\Theta$ and the attacked NN configuration parameters $\Theta^*$;
after a first predetermined condition is met, from a perspective of attacking the NN configuration parameters, obtaining the attacked NN configuration parameters $\Theta^*$, and jumping out of the step of the inner attacking loop;
a step of an outer optimization loop comprising:
taking a difference $\mathcal{L}_{robust}$ in the NN output result between the current NN configuration parameters $\Theta$ and the attacked NN configuration parameters $\Theta^*$ as a part of a total loss function $\mathcal{L}_{total}$, and obtaining a gradient of the total loss function with respect to the current NN configuration parameters $\Theta$ according to $\nabla_\Theta \mathcal{L}_{total}$;
using an optimization method based on the gradient $\nabla_\Theta \mathcal{L}_{total}$ to search for and update the current NN configuration parameters $\Theta$ so that a value of the total loss function $\mathcal{L}_{total}$ is minimized;
when a second predetermined condition is not met, entering the step of the inner attacking loop again;
after the second predetermined condition is met, jumping out of the step of the outer optimization loop and taking the current NN configuration parameters $\Theta$ updated last as target NN configuration parameters which are final.

20. A neuromorphic chip, wherein: the NN configuration parameters obtained by training with a NN configuration parameter training method using are deployed on the neuromorphic chip, wherein the NN configuration parameter training method comprises following steps:
a step of an inner attacking loop comprising:
maximizing, by searching for attacked NN configuration parameters $\Theta^*$ near current NN configuration parameters $\Theta$, a difference in an NN output result between the current NN configuration parameters $\Theta$ and the attacked NN configuration parameters $\Theta^*$;
after a first predetermined condition is met, from a perspective of attacking the NN configuration parameters, obtaining the attacked NN configuration parameters $\Theta^*$, and jumping out of the step of the inner attacking loop;
a step of an outer optimization loop comprising:
taking a difference $\mathcal{L}_{robust}$ in the NN output result between the current NN configuration parameters $\Theta$ and the attacked NN configuration parameters $\Theta^*$ as a part of a total loss function $\mathcal{L}_{total}$, and obtaining a gradient of the total loss function with respect to the current NN configuration parameters $\Theta$ according to $\nabla_\Theta \mathcal{L}_{total}$;
using an optimization method based on the gradient $\nabla_\Theta \mathcal{L}_{total}$ to search for and update the current NN configuration parameters $\Theta$ so that a value of the total loss function $\mathcal{L}_{total}$ is minimized;
when a second predetermined condition is not met, entering the step of the inner attacking loop again;
after the second predetermined condition is met, jumping out of the step of the outer optimization loop and taking the current NN configuration parameters $\Theta$ updated last as target NN configuration parameters which are final.

* * * * *